(12) United States Patent
Takemoto et al.

(10) Patent No.: US 12,111,287 B2
(45) Date of Patent: Oct. 8, 2024

(54) WIRE ROPE INSPECTION SYSTEM AND POSITIONING METHOD FOR WIRE ROPE INSPECTION SYSTEM

(71) Applicant: Shimadzu Corporation, Kyoto (JP)

(72) Inventors: Hajime Takemoto, Kyoto (JP); Yoshio Takami, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 256 days.

(21) Appl. No.: 17/729,269

(22) Filed: Apr. 26, 2022

(65) Prior Publication Data

US 2023/0018455 A1 Jan. 19, 2023

(30) Foreign Application Priority Data

Jul. 15, 2021 (JP) ................................. 2021-117171

(51) Int. Cl.
*G01N 27/9093* (2021.01)

(52) U.S. Cl.
CPC ................................. *G01N 27/9093* (2013.01)

(58) Field of Classification Search
CPC ..... G01N 27/9093; G01N 27/08; B66B 7/123
USPC .......................................................... 324/238
See application file for complete search history.

(56) References Cited

U.S. PATENT DOCUMENTS

| | | | | |
|---|---|---|---|---|
| 3,781,663 A * | 12/1973 | Abarotin | ............ | G01N 27/9093 324/262 |
| 4,427,940 A * | 1/1984 | Hirama | ................... | G01N 27/82 324/206 |
| 4,538,107 A * | 8/1985 | Varone | ................... | G01N 27/82 324/206 |
| 5,321,356 A * | 6/1994 | Weischedel | ............ | G01N 27/82 324/262 |
| 6,492,808 B1* | 12/2002 | Sukhorukov | ............ | G01B 7/32 324/242 |
| 6,720,873 B1* | 4/2004 | Tressler | ................... | B61B 12/06 200/61.18 |
| 7,686,140 B2* | 3/2010 | Rossignol | ............. | B66B 7/1215 73/158 |

(Continued)

FOREIGN PATENT DOCUMENTS

| CN | 203461661 U | | 3/2014 |
|---|---|---|---|
| CN | 111392548 A | * | 7/2020 |

(Continued)

OTHER PUBLICATIONS

Extended European Search Report (EESR) dated Oct. 26, 2022 for corresponding European patent application No. EP 22170412.5.

*Primary Examiner* — Christopher P McAndrew
(74) *Attorney, Agent, or Firm* — Muir Patent Law, PLLC

(57) ABSTRACT

A wire rope inspection system is provided with: an excitation unit configured to apply a magnetic flux to a wire rope that is an inspection target; a detection unit configured to detect a magnetic flux of the wire rope to which the magnetic flux has been applied by the excitation unit; a detachable unit configured to be detachably mounted to a stationary unit fixed in proximity to the wire rope, the detachable unit being provided with at least the detection unit; and a positioning mechanism configured to position the detachable unit with reference to the stationary unit such that the detection unit is arranged at a predetermined position with reference to the wire rope.

13 Claims, 11 Drawing Sheets

(56) References Cited

U.S. PATENT DOCUMENTS

| | | | | |
|---|---|---|---|---|
| 8,390,281 B2* | 3/2013 | Yoshioka | ............... | G01N 27/83 |
| | | | | 324/242 |
| 10,222,351 B2* | 3/2019 | Kondoh | ................. | G01N 27/82 |
| 10,514,362 B2* | 12/2019 | Yoshioka | .............. | B66B 7/1215 |
| 10,539,533 B2* | 1/2020 | Hirota | .................... | G01N 27/87 |
| 10,724,992 B2* | 7/2020 | Hirota | ................... | G01N 27/82 |
| 2011/0006762 A1* | 1/2011 | Yoshioka | ............... | G01N 27/83 |
| | | | | 324/240 |
| 2017/0038338 A1* | 2/2017 | Kondoh | ................. | G01N 27/82 |
| 2021/0107770 A1 | 4/2021 | Iijima | | |

FOREIGN PATENT DOCUMENTS

| | | | | |
|---|---|---|---|---|
| WO | WO-2004022469 A1 * | 3/2004 | ............ | B66B 7/123 |
| WO | 2011148456 A1 | 12/2011 | | |
| WO | 2019/171667 A1 | 9/2019 | | |
| WO | 2022/054314 A1 | 3/2022 | | |

* cited by examiner

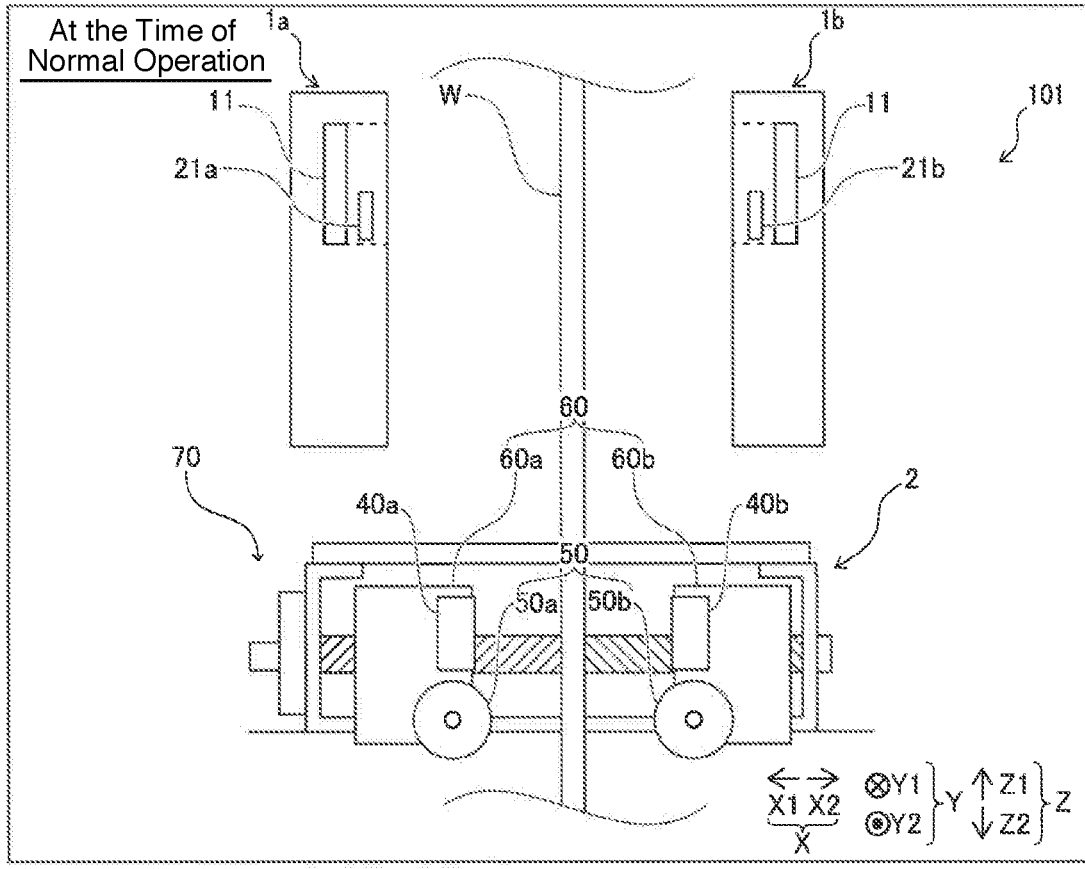
FIG.7 At the Time of Normal Operation
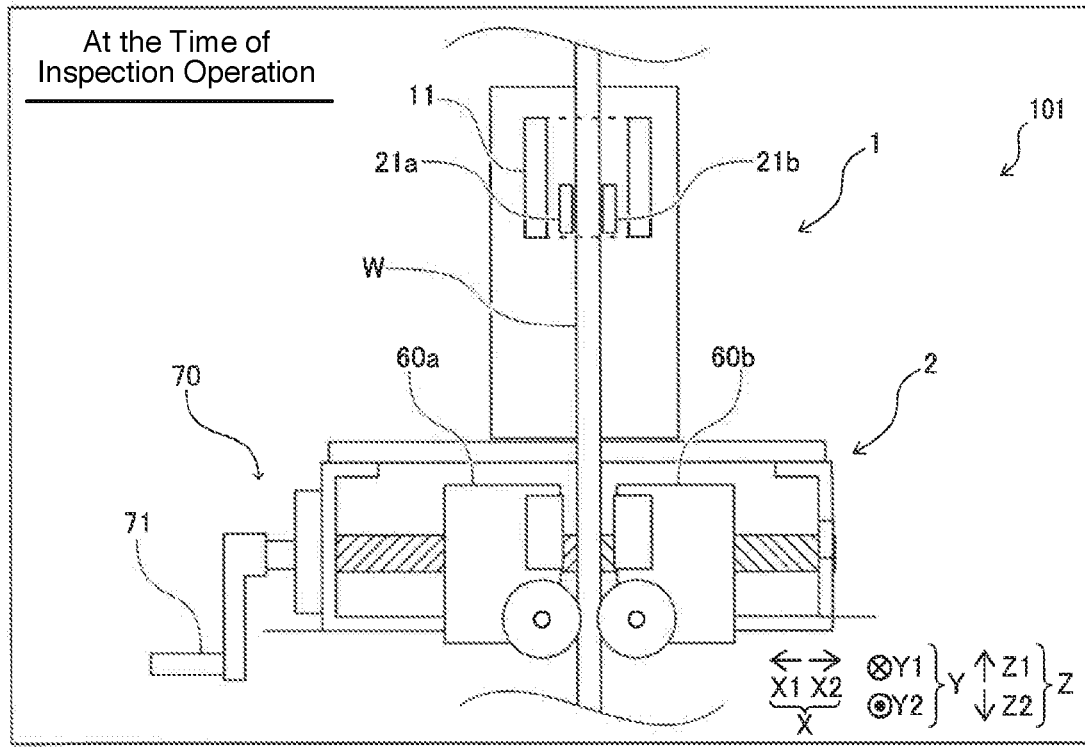
FIG.8 At the Time of Inspection Operation

WIRE ROPE INSPECTION SYSTEM AND POSITIONING METHOD FOR WIRE ROPE INSPECTION SYSTEM

CROSS-REFERENCE TO RELATED APPLICATIONS

The related application number JP2021-117171, entitled "Wire Rope Inspection System and Positioning Method for Wire Rope Inspection System," filed on Jul. 15, 2021 and invented by Hajime TAKEMOTO and Yoshio TAKAMI, upon which this patent application is based, is hereby incorporated by reference.

BACKGROUND OF THE INVENTION

Field of the Invention

The present invention relates to a wire rope inspection system and a positioning method for the wire rope inspection system.

Description of the Background Art

Conventionally, a magnetic body inspection device for inspecting a wire rope (magnetic body) is known. Such a device is disclosed, for example, in International Publication No. WO 2019/171667.

The above-described International Publication No. WO 2019/171667 discloses a wire rope inspection device (magnetic body inspection device) equipped with an excitation unit provided for a wire rope and a detection coil for detecting the magnetic flux (magnetic field) of the wire rope. The wire rope inspection device described in International Publication No. WO 2019/171667 as described above is configured to detect the change in the magnetic flux of the wire rope generated by applying a magnetic flux by the excitation unit, by the detection coil.

Here, although not described in the above-described Patent Document, i.e., International Publication No. WO 2019/171667, in order to accurately inspect the wire rope by the detection coil, it is necessary to accurately position the detection coil so as to reduce the gap between the wire rope and the detection coil. In this instance, in the case of a portable type device in which the inspection is performed without permanently installing the wire rope inspection device with respect to the wire rope and that the wire rope inspection device is installed with respect to the wire rope only when the inspection is performed and removed after the inspection, it is necessary to arrange the detection coil with respect to the wire rope each time when the inspection is performed.

Therefore, it is a burden for the inspection operator to accurately arrange the detection coil each time when the inspection is performed. For this reason, it has been desired to reduce the workload for accurately arranging the portable detection coil (detection unit) for inspecting the wire rope with respect to the wire rope.

SUMMARY OF THE INVENTION

The present invention has been made to solve the aforementioned problems. One object of the present invention is to provide a wire rope inspection system capable of reducing a workload for accurately arranging a portable detection unit for inspecting a wire rope with respect to the wire rope. Another object thereof is to provide a positioning method for the wire rope inspection system.

In order to attain the above-described object, the wire rope inspection system according to a first aspect of the present invention includes:
  an excitation unit configured to apply a magnetic flux to a wire rope that is an inspection target;
  a detection unit configured to detect a magnetic flux of the wire rope to which the magnetic flux has been applied by the excitation unit;
  a detachable unit configured to be detachably mounted on a stationary unit fixed in proximity to the wire rope, the detachable unit being provided with at least the detection unit; and
  a positioning mechanism configured to position the detachable unit with respect to the stationary unit such that the detection unit is arranged at a predetermined position with reference to the wire rope.

A positioning method for a wire rope inspection system according to a second aspect of the present invention, includes the steps of:
  attaching a positioning jig configured to adjust a relative position of a stationary unit fixed in proximity to a wire rope that is an inspection target with respect to the wire rope such that a detection unit configured to detect a magnetic flux of the wire rope is arranged at a predetermined position with reference to the wire rope;
  setting a positioning mechanism configured to position a detachable unit with respect to the stationary unit by adjusting a position of the stationary unit such that the positioning jig is arranged along the wire rope, the detachable unit being provided with at least a detection unit and being configured to be detachably attached to the stationary unit; and
  positioning the detachable unit with respect to the stationary unit by the positioning mechanism by which the detachable unit has been positioned by attaching the detachable unit to the stationary unit to detect the magnetic flux of the wire rope by the detection unit.

In the above-described wire rope inspection system according to the first aspect of the present invention and the positioning method for the wire rope inspection system according to the second aspect of the present invention, the positioning mechanism is used. This positioning mechanism positions the detachable unit with respect to the stationary unit such that the detection unit is positioned at a predetermined position with reference to the wire rope. With this, the removable portable detachable unit is positioned with respect to the stationary unit by the positioning mechanism, and therefore, the portable detection unit provided at the detachable unit can be easily arranged at a predetermined position with reference to the wire rope. For this reason, it is possible to easily arrange the portable detection unit at a precise position for inspecting the wire rope. Consequently, it is possible to reduce the workload for accurately arranging the portable detection unit for inspecting the wire rope with reference to the wire rope.

BRIEF DESCRIPTION OF THE DRAWINGS

FIG. 7 is a diagram showing a configuration of a detachable unit and a stationary unit at the time of a normal operation.

FIG. 8 is a diagram showing a configuration of a detachable unit and a stationary unit at the time of an inspection operation.

DESCRIPTION OF THE PREFERRED EMBODIMENTS

Hereinafter, some embodiments in which the present invention is embodied will be described with reference to the attached drawings.

With reference to FIGS. 1 to 12, a configuration of a wire rope inspection system 100 according to one embodiment of the present invention will be described. In the following description, note that the term "perpendicular" means intersecting at an angle of 90 degrees or nearly 90 degrees. Further, the term "parallel" means parallel and substantially parallel.

(Configuration of Wire Rope Inspection System)

Figure 1:
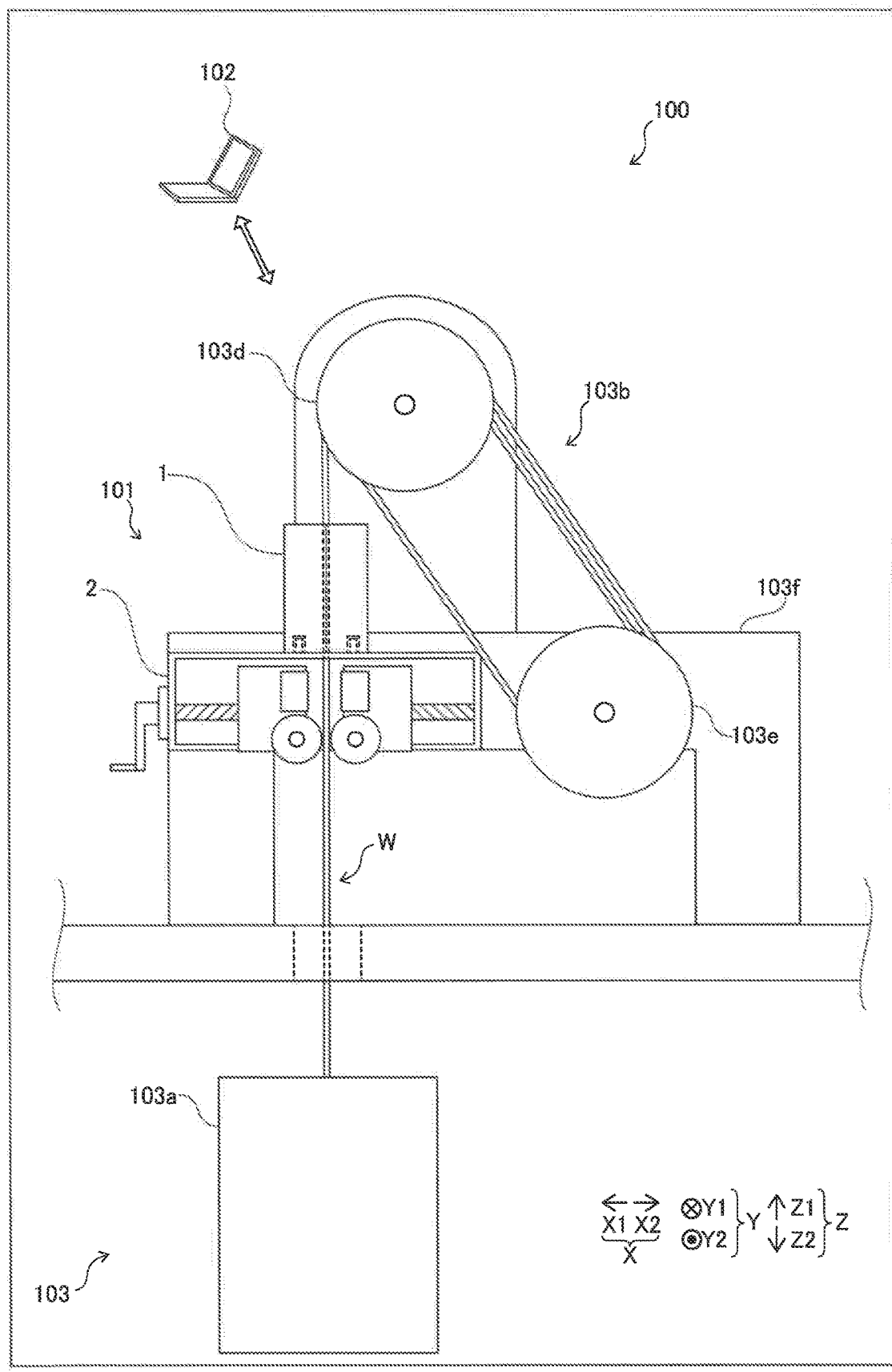
FIG. 1 is a front view showing an entire configuration of a wire rope inspection system according to one embodiment.
Figure 2:
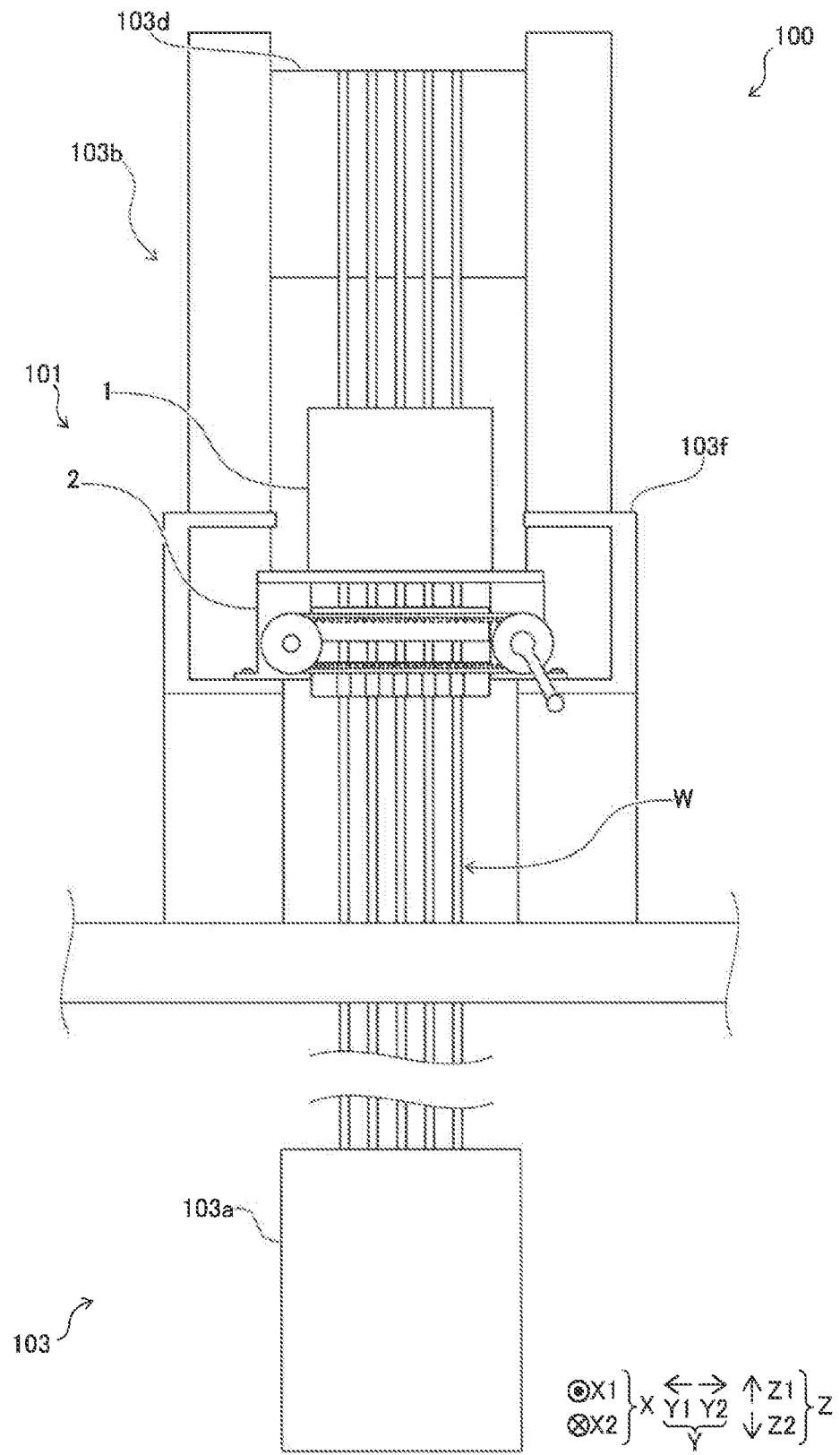
FIG. 2 is a side view showing an entire configuration of a wire rope inspection system according to one embodiment.

As shown in FIGS. 1 and 2, the wire rope inspection system 100 is provided with a wire rope inspection device 101 and a processing device 102. The wire rope inspection system 100 inspects the wire rope W provided on an elevator 103. Specifically, the wire rope inspection system 100 is a system for inspecting abnormalities (such as, e.g., wire disconnection) of the wire rope W of the elevator 103, which is an inspection target.

Further, the wire rope inspection system 100 is a system capable of confirming abnormalities of the wire rope W that are difficult to visually confirm, by a total magnetic flux method that measures the magnetic flux inside the wire rope W. In a case where a wire rope W contains abnormal portions (wire rupture, thinning, rust, etc.), the magnetic flux in the abnormal part differs from the magnetic flux in the normal part. The total magnetic flux method is a method capable of measuring abnormal portions inside the wire rope W, unlike a method that measures the magnetic leakage flux from the abnormal portions on the surface of the wire rope W. Further, the wire rope inspection system 100 is configured to perform (initiate) the inspection of the wire rope W, based on the input operation by the inspection operator to the processing device 102.

(Configuration of Elevator)

Figure 3:
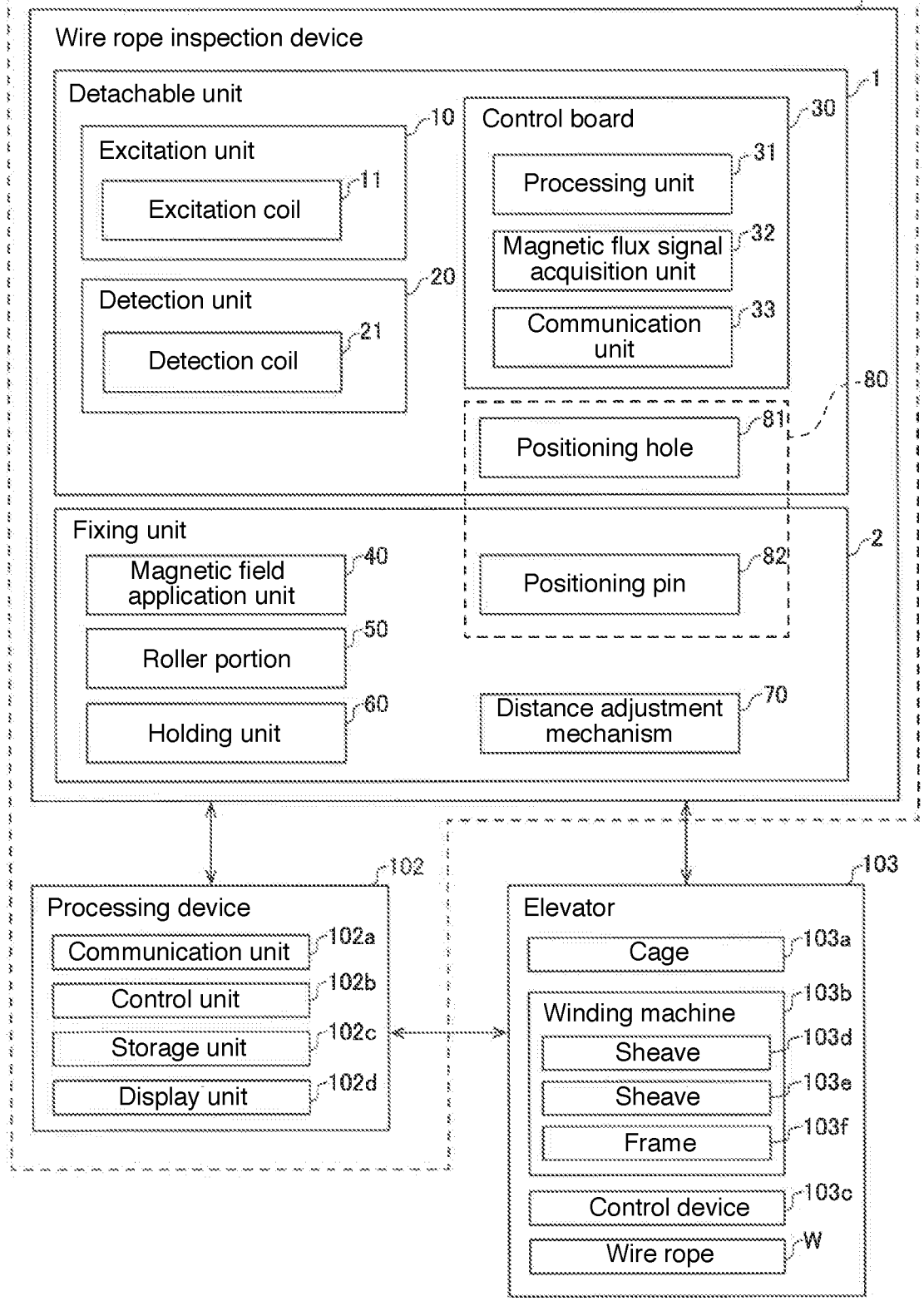
FIG. 3 is a block diagram showing an entire configuration of a wire rope inspection system according to one embodiment.

As shown in FIGS. 1 to 3, the elevator 103 is provided with a cage 103a, a winding machine 103b, a control device 103c, and a wire rope W. The cage 103a loads persons, loads, and the like. The winding machine 103b moves the wire rope W to raise and lower the cage 103a. For example, the winding machine 103b winds up the wire rope W suspending the cage 103a by driving a motor (not illustrated). Note that the winding machine 103b is an example of the "drive unit" recited in claims.

Specifically, the winding machine 103b includes a sheave 103d, a sheave 103e, and a frame 103f. The wire rope W is wound around the sheave 103d and the sheave 103e. In the winding machine 103b, a motor (not illustrated) is connected to the sheave 103d. When the motor (not illustrated) rotates the sheave 103d, the wire rope W moves vertically (in the Z-direction). The frame 103f is a main body (housing) for installing the winding machine 103b. Note that the frame 103f is an example of the "main body" recited in claims.

The elevator 103 is, for example, a double-wrap (full-wrap) rope-type elevator. The double-wrap type denotes a structure in which the wire rope W guided from the sheave 103d of the winding machine 103b to the sheave 103e, which is a deflector wheel, is again returned to the sheave 103d, thereby winding the wire rope W on the sheave 103d twice.

The control device 103c includes a control board for controlling the operation of each part of the elevator 103. The control device 103c includes a radio communication module and the like and is configured to be able to communicate with the wire rope inspection device 101 and the processing device 102. The control device 103c is configured to change the moving speed (operation speed) of the cage 103a of the elevator 103 between at the time of a normal operation in which it is operated with persons and loads loaded and at the time of an inspection operation in which the inspection of the wire rope W is performed, based on the input operation to the processing device 102. For example, at the time of the normal operation, the operation speed (the moving speed of the wire rope W) is about 100 m/min or more 500 m/min or less. At the time of the inspection operation, the operation speed is about 10 m/min or more and 40 m/min or less. Further, the vibrations of the wire rope W increase as the operation speed of the elevator 103 increases.

The wire rope W is formed by braiding (e.g., strand-braiding) magnetic wire materials and is a magnetic body made of an elongated member. In order to prevent the wire rope W from being disconnected due to deterioration, the wire rope inspection device 101 inspects the state (the presence or absence of damage or the like). As a result of the measurement of the magnetic flux of the wire rope W, the wire rope W determined that the degree of degradation has exceeded a predetermined criterion will be replaced by the inspection operator. In the example shown in FIG. 1, for convenience, only one wire rope W is illustrated, but the elevator 103 is provided with a plurality of wire ropes W. For example, the elevator 103 is provided with five wire ropes W (see FIG. 2).

(Configuration of Processing Device)

As shown in FIG. 3, the processing device 102 is provided with a communication unit 102a, a control unit 102b, a storage unit 102c, and a display unit 102d. The processing device 102 displays the measurement result of the magnetic flux of the wire rope W by the wire rope inspection device 101 and analyzes based on the measurement result of the magnetic flux of the wire rope W by the wire rope inspection device 101. Specifically, the processing device 102 is configured to acquire the detection signal (measurement result) from the detection coil 21 of a detection unit 20, which will be described later, and determine the presence or absence of the abnormality of the wire rope W based on the acquired detection signal. The processing device 102 is, for example, a personal computer used by the inspection operator who inspects the wire rope W.

The communication unit 102a is configured to be able to communicate with the wire rope inspection device 101 and a control device 103c of the elevator 103. The communication unit 102a is a communication interface. Specifically, the communication unit 102a includes a wireless communication module capable of wireless communication by a wireless LAN, Bluetooth, and the like. The processing device 102 receives the measurement result (magnetic flux signal) of the wire rope W by the wire rope inspection device 101 via the communication unit 102a. The processing device 102 is configured to be able to acquire the operation mode information (operation mode switching information) of the elevator 103 from the elevator 103 (the control device 103c of the elevator 103).

The control unit 102b controls each part of the processing device 102. The control unit 102b includes a processor, such as, e.g., a CPU (Central Processing Unit), a memory, and the like. The control unit 102b analyzes the damages (abnormalities) of the wire rope W, such as, e.g., the wire disconnection (wire breakage), based on the measurement result (detection signal) of the wire rope W received via the communication unit 102a.

The storage unit 102c is a storage medium including, for example, a flash memory, and stores the information on the measurement result of the wire rope W from the detection coils 21, the analysis result of the measurement result of the wire rope W by the control unit 102b, and the like.

The display unit 102d is, for example, a liquid crystal monitor and displays the information on the measurement result of the wire rope W, the analysis result of the measurement result of the wire rope W by the control unit 102b, and the like.

(Configuration of Wire Rope Inspection Device)

Next, the configuration of the wire rope inspection device 101 in this embodiment will be described.

As shown in FIG. 3, the wire rope inspection device 101 is provided with, as the configuration for measuring the magnetic flux (magnetic field) of the wire rope W, the excitation unit 10, the detection unit 20, the control board 30, and the magnetic field application unit 40.

In this embodiment, the excitation unit 10 is configured to apply a magnetic field (magnetic flux) to the wire rope W. Specifically, the excitation unit 10 includes an excitation coil 11 for exciting (vibrating) the magnetization state of the wire rope W. The detection unit 20 includes a detection coil 21. In this embodiment, the detection coil 21 detects the magnetic flux of the wire rope W to which a magnetic field has been applied by the excitation unit 10. Further, the detection coil 21 detects the magnetic flux inside the wire rope W by a total magnetic flux method and outputs a magnetic flux signal as a detection signal. The details of the excitation unit 10 and the detection unit 20 will be described later.

The control board 30 includes a processing unit 31, a magnetic flux signal acquisition unit 32, and a communication unit 33. The control board 30 controls the operation of the excitation unit 10 (excitation coil 11) based on the control signal from the processing unit 31. Further, the control board 30 controls each part of the wire rope inspection device 101 by the control processing by the processing unit 31. The processing unit 31 includes a processor, such as, e.g., a CPU, a memory, and an AD converter.

The magnetic flux signal acquisition unit 32 acquires (receives) the magnetic flux signal from the detection unit 20 (detection coil 21). The magnetic flux signal acquisition unit 32 includes an amplifier. The magnetic flux signal acquisition unit 32 amplifies the acquired magnetic flux signal and outputs (transmits) the amplified magnetic flux signal to the processing unit 31.

The communication unit 33 is configured to be able to communicate with the processing device 102 and the control device 103c of the elevator 103. The communication unit 33 includes a wireless communication module capable of wireless communication by a wireless LAN, Bluetooth (registered mark), and the like. The communication unit 33 outputs (transmits) the acquired magnetic flux signal to the processing device 102. Note that the connection between the wire rope inspection device 101, the processing device 102, and the control device 103c of the elevator 103 via the communication unit 33 may be a wired connection.

Further, the magnetic field application unit 40 aligns the magnetization direction of the wire rope W by applying a magnetic field to the wire rope W in advance. The magnetic field application unit 40 is, for example, a permanent magnet. The details of the magnetic field application unit 40 will be described later.

<Abnormality Detection by Total Magnetic Flux Method>

Figure 4:
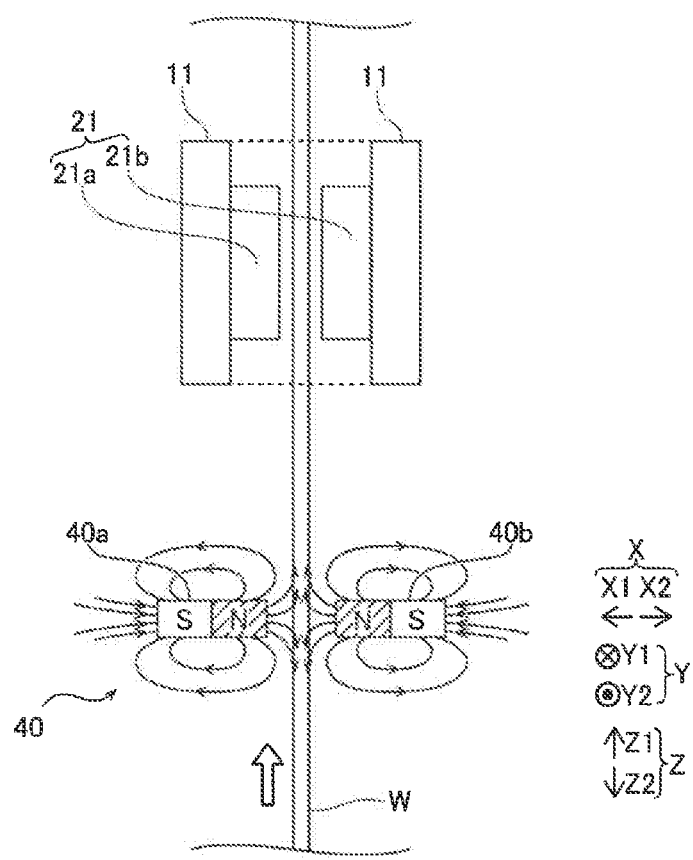
FIG. 4 is a diagram for explaining an inspection by a total magnetic flux method.
Figure 5:
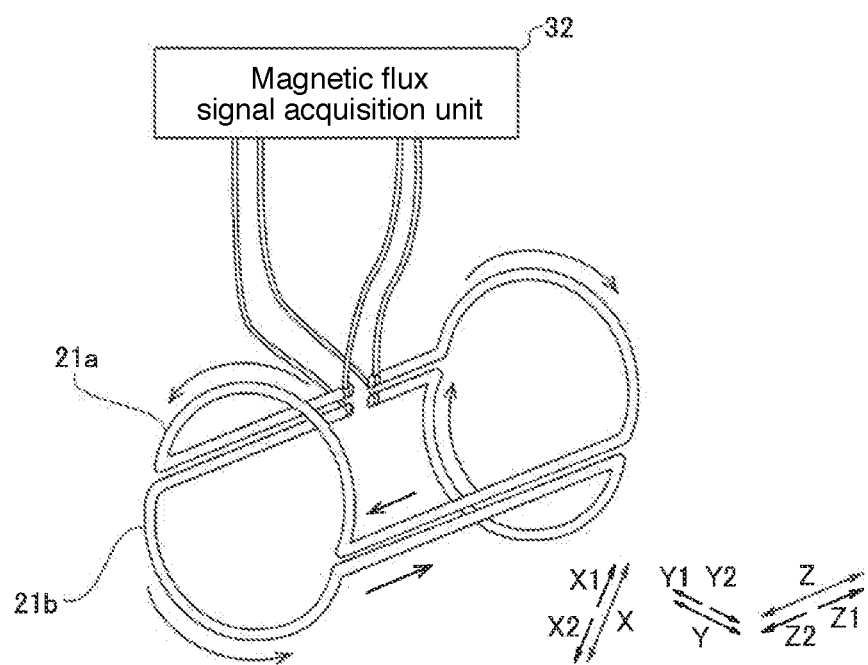
FIG. 5 is a diagram for explaining a configuration of a detection coil of a detection unit.

As shown in FIGS. 4 and 5, at the time of the inspection operation, in the wire rope inspection system 100 according to this embodiment, the wire rope W is guided in the Z1-direction (vertically upward direction) in accordance with the rotation of the sheave 103d, with respect to the wire rope inspection device 101 arranged between the sheave 103d and the cage 103a.

The wire rope W guided to the wire rope inspection device 101 is, first, aligned in the magnetic field in advance by the magnetic field application unit 40. Then, the excitation coil 11 of the excitation unit 10 excites the magnetic field (magnetic flux) of the wire rope W in which the magnetic field has been aligned (magnetized) in advance. After the magnetization, the detection coil 21 of the detection unit 20 detects the magnetic flux of the wire rope W in a state of being excited. That is, in this embodiment, the detection coil 21 is configured to detect the magnetic flux of the wire rope W after the magnetic field has been applied in advance by the magnetic field application unit 40 (after being magnetized).

The magnetic field application unit 40 includes a pair of the magnetic field application part 40a and the magnetic field application part 40b to be arranged in a direction (X-direction) perpendicular to the extending direction of the wire rope W. The pair of the magnetic field application part 40a and the magnetic field application part 40b are arranged on both sides in the transverse direction of the wire rope W (in the direction perpendicular to the extending direction of the wire rope W, i.e., in the X-direction) so as to sandwich the wire rope W. Specifically, the magnetic field application part 40a is arranged on the X1-direction side of the wire rope W. The magnetic field application part 40b is arranged on the X2-direction side of the wire rope W.

The magnetic field application unit 40 is provided such that the N-pole (illustrated with diagonal lines) of the magnetic field application part 40a oriented in the X2-direction and the N-pole (illustrated with diagonal lines) of the magnetic field application part 40b oriented in the X1-direction are faced to each other across the wire rope W. The magnetic field application part 40a and the magnetic field application part 40b are configured to be able to apply a relatively strong magnetic field to substantially uniformly align the magnetization direction of the wire rope W.

Further, the excitation coil 11 is provided so as to collectively surround all of the plurality (five) wire ropes W along the extending direction (Z-direction) of the wire rope W. Then, the excitation coil 11 is provided so as to surround the outer side of the detection coil 21 with respect to the wire rope W. The excitation coil 11 generates a magnetic flux (magnetic field) inside the coil (the inner side of the ring of the coil) along the extending direction (Z-direction) of the wire rope W by the flow of the exciting AC current. The excitation coil 11 applies the generated magnetic flux (magnetic field) to the wire rope W.

Specifically, an alternating current (excitation current) having a constant magnitude and a constant frequency is flowed through the excitation unit 10 (excitation coil 11) under the control of the processing unit 31. With this, a magnetic field is applied so as to oscillate in the extending direction (Z-direction) of the wire rope W. That is, in the wire rope W, the magnetic field (magnetic flux) pre-aligned by the magnetic field application unit 40 is oscillated such that a magnetic field in the Z1-direction and a magnetic field in the Z2-direction periodically appear by the excitation unit 10.

<Detection of Magnetic Flux by Detection Coil>

The detection coil 21 includes a first detection coil 21a and a second detection coil 21b. The first detection coil 21a is arranged on a side in a direction (X1-direction side) perpendicular to the extending direction of the wire rope W. The second detection coil 21b is arranged so as to surround the wire rope W together with the first detection coil 21a on a side (X2-direction side) opposite to the side where the first detection coil 21a is arranged, with respect to the wire rope W. The detection coil 21 is arranged so as to sandwich a single wire rope W by the two coils, i.e., the first detection coil 21a and the second detection coil 21b.

Note that the detection coil 21 is provided for each of the plurality (five) of wire ropes W. That is, for each of the plurality (five) of wire ropes W, two coils, i.e., the first detection coil 21a and the second detection coil 21b, are provided.

As shown in FIG. 5, the first detection coil 21a and the second detection coil 21b each are an independent straddle-type coil (saddle-type coil). Each of the first detection coil 21a and the second detection coil 21b is arranged so as to cover the half circumference of the wire rope W. Therefore, by combining the first detection coil 21a and the second detection coil 21b, the detection coil 21 surrounding the periphery of the wire rope W over the entire circumference is configured.

Further, the detection coil 21 (the first detection coil 21a and the second detection coil 21b) is configured by a conductive pattern provided on a flexible substrate. Further, the first detection coil 21a and the second detection coil 21b are provided so as to surround the wire rope W along the extending direction of the wire rope W. That is, the detection coil 21 is provided so as to surround the entire circumference of the wire rope W by the two straddle-type coils along the extending direction (Z-direction) of the wire rope W.

It should be understood that in this specification, the term "wind (winding)" is used to describe the concept including not only winding by one turn or more but also winding by the number (angle) of one turn or less (for example, a half-turn).

Further, each of the first detection coil 21a and the second detection coil 21b is provided so as to surround the wire rope W along the extending direction (Z-direction) of the wire rope W. Thus, the first detection coil 21a and the second detection coil 21b detect (measure) the magnetic flux penetrating the inside of the coil along the extending direction (X-direction) of the wire rope W.

The detection coil 21 (the first detection coil 21a and the second detection coil 21b) is configured to detect the change in the magnetic flux (magnetic field) that is periodically time-changed by the excitation unit 10 (the excitation coil 11). Further, the detection coil 21 (the first detection coil 21a and the second detection coil 21b) outputs the magnetic flux signal (detection signal) indicating the detected magnetic flux to the magnetic flux signal acquisition unit 32 of the control board 30. For example, in the case of detecting the magnetic fluxes for five wire ropes W, a total of ten magnetic flux signals is acquired by the magnetic flux signal acquisition unit 32.

(Configurations of Detachable Unit and Stationary Unit)

Figure 6:
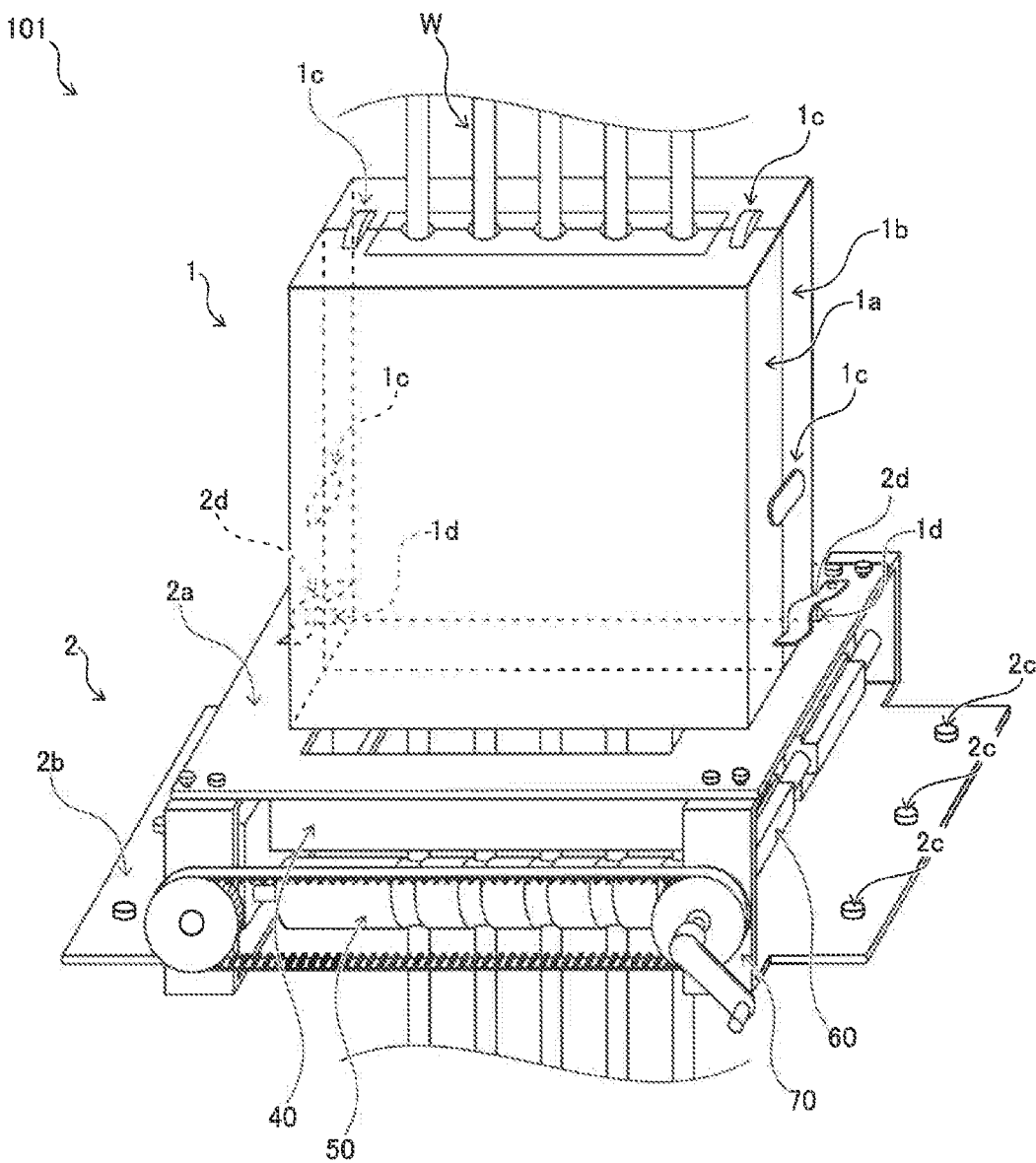
FIG. 6 is a perspective view showing a configuration of a wire rope inspection device according to one embodiment.

As shown in FIG. 6, in this embodiment, the wire rope inspection device 101 is provided with a detachable unit 1 and a stationary unit 2. In this embodiment, the detachable unit 1 is detachably attached to the stationary unit 2. The stationary unit 2 has been fixed in proximity to the wire rope W.

Specifically, the stationary unit 2 has been fixed to the frame 103f of the winding machine 103b. The detachable unit 1 is attached to the stationary unit 2 so as to surround a portion of the wire rope W extending from the sheave 103d of the winding machine 103b to the cage 103a. The wire rope inspection system 100 of this embodiment is configured to operate the elevator 103 in a state in which the detachable unit 1 is detached from the stationary unit 2 at the time of the normal operation and perform the inspection operation in a state in which the detachable unit 1 is attached to the stationary unit 2 at the time of the inspection operation.

<Detachable Unit>

As shown in FIGS. 7 and 8, in this embodiment, the detachable unit 1 is configured to be able to be divided into a first detachable unit 1a and a second detachable unit 1b. The first detachable unit 1a is arranged on one side (X1-direction side) in the direction (X-direction) perpendicular to the extending direction (Z-direction) of the wire rope W. The second detachable unit 1b is arranged on the other side (X2-direction side) in the direction (X-direction) perpendicular to the extending direction of the wire rope W (Z-direction). The detachable unit 1 is attached to the stationary unit 2 in a state in which the first detachable unit 1a and the second detachable unit 1b are combined.

Further, as shown in FIG. 6, the detachable unit 1 includes a plurality of connecting members 1c. The connecting member 1c fixes the first detachable unit 1a and the second detachable unit 1b in a state in which the first detachable unit 1a and the second detachable unit 1b are combined. Further, the detachable unit 1 includes an engaging part 1d and an engaging part 1d. Each engaging part 1d is engaged with a fixing member 2d of the stationary unit 2, which will be described later. For example, the engaging part 1d is provided to each of the Y1-direction side surface and the Y2-direction side surface of the second detachable unit 1b and has a pin-shape. The first detachable unit 1a and the second detachable unit 1b, which are fixed in a state of being combined each other by the connecting members 1c, are fixedly attached to the stationary unit 2 by engaging the fixing member 2d with the engaging part 1d.

Further, as shown in FIGS. 7 and 8, the detachable unit 1 has a rectangular parallelepiped shape. Further, the detachable unit 1 is a removable portable housing in which the excitation unit 10 and the detection unit 20 are arranged. That is, the excitation unit 10 and the detection unit 20 of the wire rope inspection device 101 according to this embodiment are portable. The excitation unit 10 and the detection unit 20 are arranged in each of the first detachable unit 1a and the second detachable unit 1b which are in a divided state.

Specifically, the excitation coil 11 of the excitation unit 10 forms a coil loop so as to be surround the wire rope W in a state in which the first detachable unit 1a and the second detachable unit 1b are combined. For example, the excitation unit 10 is provided with a connector portion (not illustrated) configured to be connected when the first detachable unit 1a and the second detachable unit 1b are combined. That is, when the first detachable unit 1a and the second detachable unit 1b are combined, the connector portion is connected, thereby forming a coil loop by the excitation coil 11 so as to surround the wire rope W.

The first detection coil 21a and the second detection coil 21b of the detection unit 20 are arranged at the first detachable unit 1a and the second detachable unit 1b, respectively. By combining the first detachable unit 1a and the second detachable unit 1b, the detection unit 20 (the first detection coil 21a and the second detection coil 21b) is arranged around the wire rope W.

Similarly, the control board 30 is arranged at the detachable unit 1. For example, the control board 30 is arranged on the side of the first detachable unit 1a of the detachable unit 1. The control board 30 is configured to acquire a detection signal from the second detection coil 21b arranged on the side of the second detachable unit 1b when the connector portions (not illustrated) provided in each of the first detachable unit 1a and the second detachable unit 1b are connected in the case of combining the first detachable unit 1a and the second detachable unit 1b.

<Stationary Unit>

As shown in FIG. 6, in this embodiment, the stationary unit 2 includes a detachable unit mounting portion 2a. The detachable unit mounting portion 2a is configured to mount the detachable unit 1 thereon. The detachable unit mounting portion 2a is, for example, a plate-shaped mounting table for arranging the detachable unit 1 of a rectangular parallelepiped shape thereon. Specifically, the detachable unit mounting portion 2a has a U-shape through which the wire rope W is passed. Further, the detachable unit mounting portion 2a is configured such that the relative position with respect to the wire rope W can be adjusted. Specifically, the detachable unit mounting portion 2a is mounted on the base portion 2b fixed to the frame 103f in such a manner as to be adjustable with respect to the base portion 2b. The detail of the position adjustment of the detachable unit mounting portion 2a will be described later.

Further, the stationary unit 2 includes a plurality of fastening members 2c. The plurality of fastening members 2c is, for example, a screw or a bolt. In the stationary unit 2, the base portion 2b is fixed to the frame 103f of the winding machine 103b by the plurality of fastening members 2c.

The stationary unit 2 includes a fixing member 2d. The fixing member 2d is provided to the detachable unit mounting portion 2a. The fixing member 2d is provided so as to be rotatable along the mounting surface of the detachable unit mounting portion 2a on which the detachable unit 1 is mounted. The fixing member 2d is engaged with the engaging part 1d of the detachable unit 1 by being rotated. With this, the detachable unit 1 mounted (arranged) on the detachable unit mounting portion 2a is fixed to the stationary unit 2. Note that two fixing members 2d are provided to the detachable unit mounting portion 2a.

As shown in FIGS. 3 and 6, the stationary unit 2 includes a magnetic field application unit 40, a roller unit 50, a holding unit 60, and a distance adjustment mechanism 70. Note that the roller unit 50 is an example of the "movement suppressing unit" recited in claims.

As shown in FIGS. 7 and 8, the roller unit 50 includes a roller 50a arranged on the X1-direction side and a roller 50b arranged on the X2-direction side. In this embodiment, the roller unit 50 suppresses the movements (vibrations) of the wire rope W in the direction (direction along the XY-plane) perpendicular to the extending direction (Z-direction) of the wire rope W by coming into contact with the wire rope W. Each of the rollers 50a and 50b is provided with a groove which will be brought into contact with the wire rope W. Each of the rollers 50a and 50b is configured to be rotatable about the rotation axis arranged along the Y-direction. Each of the rollers 50a and 50b is brought into contact with the wire rope W in such a manner as to sandwich the wire rope W from both sides in the X-direction, thereby suppressing the movements (vibrations) of the wire rope W.

In this embodiment, the stationary unit 2 includes a holding unit 60. The holding unit 60 holds the magnetic field application unit 40 and the roller unit 50 in the stationary unit 2. Specifically, the holding unit 60a is arranged on the X1-direction side of the stationary unit 2, and the holding unit 60b is arranged on the X2-direction side thereof. The holding unit 60a holds the magnetic field application part 40a and the roller 50a. Further, the holding unit 60b holds the magnetic field application part 40b and the roller 50b.

In this embodiment, the holding unit 60 is configured to be able to change the separation distance from the wire rope W. Specifically, the holding unit 60a and the holding unit 60b are moved by a distance adjustment mechanism 70 in a direction to approach each other and in a direction away from each other along the X-direction. Specifically, in this embodiment, the distance adjustment mechanism 70 can make the separation distance between the holding unit 60 (the magnetic field application unit 40 and the roller unit 50) and the wire rope W relatively small at the time of the inspection operation by moving the holding unit 60. Further, the distance adjustment mechanism 70 can make the separation distance between the holding unit 60 (the magnetic field application unit 40 and the roller unit 50) and the wire rope W relatively small at the time of the normal operation by moving the holding unit 60.

Figure 9:
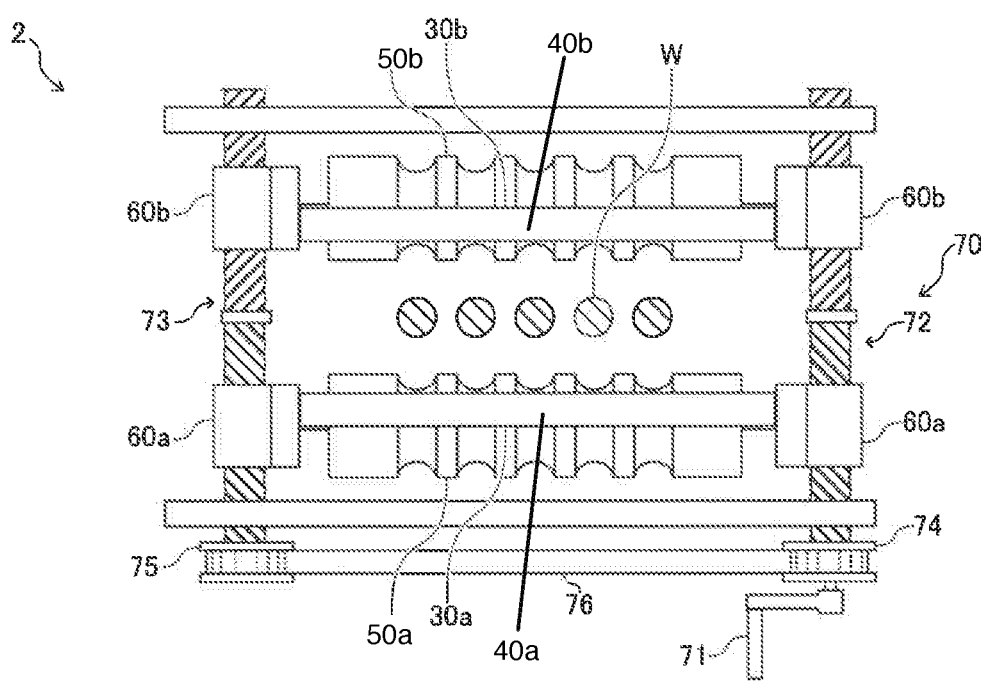
FIG. 9 is a diagram for explaining a movement of a holding unit in a stationary unit.

Specifically, as shown in FIG. 9, the distance adjustment mechanism 70 includes a handle portion 71, two threaded bars 72 and 73, two toothed pulleys 74 and 75, and a toothed belt 76. In the distance adjustment mechanism 70, the handle portion 71 is rotated by the inspection operator about the X-direction as a rotation axis, which rotates the threaded bar 72 in the Y2-direction. When the handle portion 71 is rotated, the toothed pulley 74 is rotated in the Y2-direction. In accordance with the rotation of the toothed pulley 74, the toothed belt 76 is moved. In accordance with the movement of the toothed belt 76, the toothed pulley 75 on the Y1-direction side is rotated in synchronization with the rotation of the toothed pulley 74. Then, the threaded bar 73 on the Y1-direction side is rotated together with the toothed pulley 75. That is, when the handle portion 71 is rotated, the threaded bar 72 and the threaded bar 73 are rotated synchronously.

The threaded bar 72 and the threaded bar 73 are each engaged with the holding unit 60a on the X1-direction side and the holding unit 60b on the X2-direction side. The threaded bars 72 and 73 are each configured such that the screw thread direction is reversed on the X1-direction side and the X2-direction side. With this, when the threaded bars 72 and 73 are rotated, the holding units 60a and 60b are moved in a direction to approach each other and in a direction away from each other. Thus, the magnetic field application unit 40 and the roller unit 50 are configured such that when the inspection operator rotates the handle portion 71, the magnetic field application unit 40 and the roller unit 50 are moved in the stationary unit 2 in a direction to approach the wire rope W so as to be arranged at the inspection operation position at the time of the inspection operation and in a direction away from the wire rope W so as to be arranged at the normal position at the time of the normal operation.

Note that the handle portion 71 is configured to be detachable. Therefore, the handle portion 71 is attached when moving the holding unit 60 (the magnetic field application unit 40 and the roller unit 50) to perform the inspection operation and is removed at the time of the normal operation.

(Positioning Mechanism)

Figure 10:
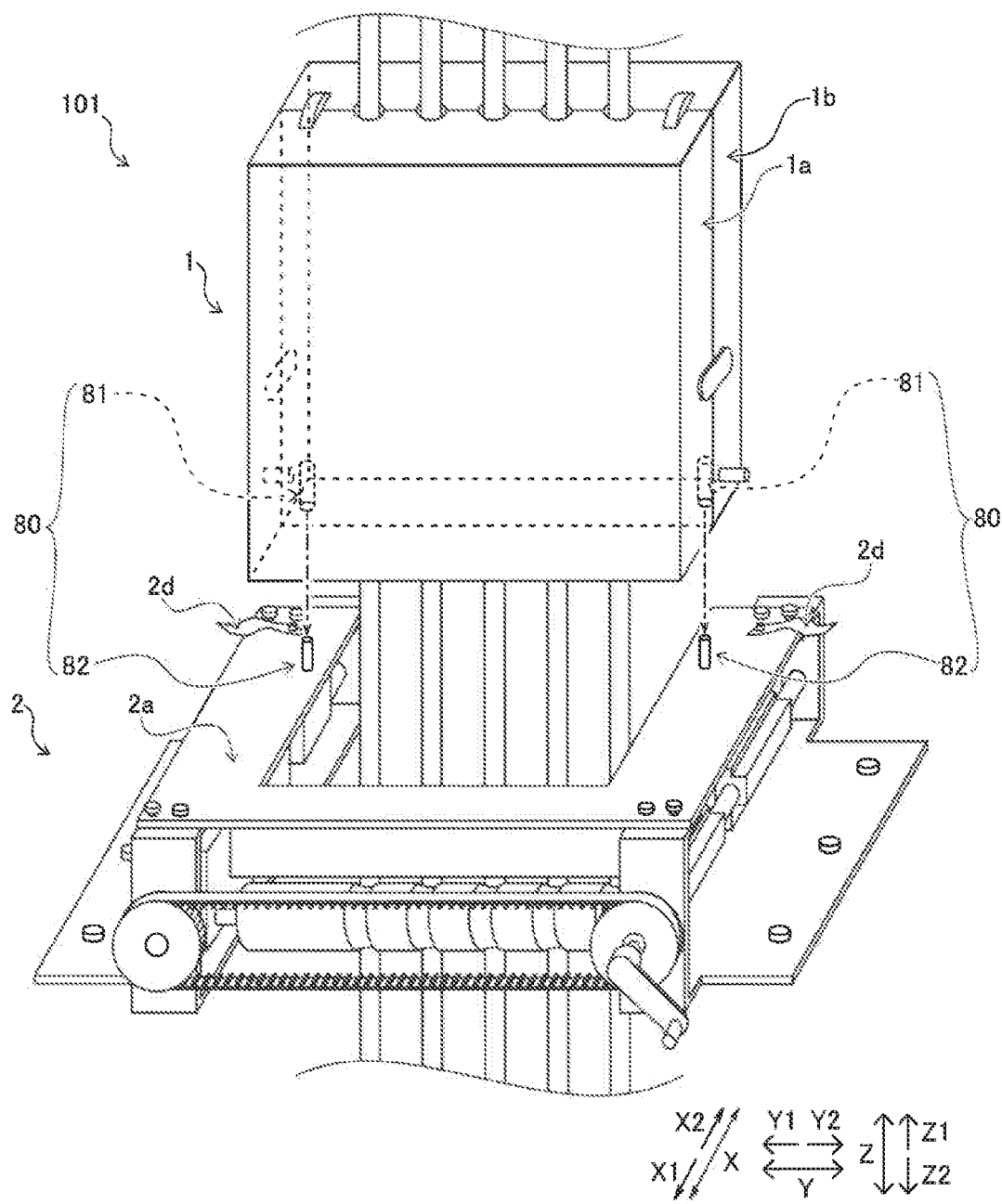
FIG. 10 is a diagram showing a positioning mechanism according to one embodiment.

As shown in FIGS. 3 and 10, in this embodiment, the wire rope inspection device 101 is provided with a positioning mechanism 80. The positioning mechanism 80 positions the detachable unit 1 with respect to the stationary unit 2 such that the excitation unit 10 and the detection unit 20 are arranged at a predetermined position with reference to the wire rope W at the time of the inspection operation. Note that in FIG. 10, the magnetic field application part 40b and the roller 50b on the X2-direction side are not illustrated.

Specifically, the positioning mechanism 80 positions the detachable unit 1 in a state of being attached to the detachable unit mounting portion 2a of the stationary unit 2 with respect to the stationary unit 2 such that the excitation unit 10 and the detection unit 20 are arranged at the predetermined position surrounding the part of the wire rope W extending from the sheave 103d of the winding machine 103b of the elevator 103 to the cage 103a. That is, the detachable unit 1 is positioned with respect to the stationary unit 2 by the positioning mechanism 80. With this, the detection unit 20 and the excitation unit 10 are arranged so as to surround the wire rope W at the predetermined position (inspection position) where the inspection around the wire rope W is performed.

In this embodiment, the positioning mechanism 80 includes a positioning hole 81 provided in the detachable unit 1 and a positioning pin 82 provided to the stationary unit 2. The positioning hole 81 is engaged with the positioning pin 82. When the positioning pin 82 provided to the stationary unit 2 is engaged with the positioning hole 81 (inserted into the positioning hole 81) provided in the detachable unit 1, the detachable unit 1 is positioned with respect to the stationary unit 2.

Note that the positioning pin 82 is an example of the "first engaging part" recited in claims. Further note that the positioning hole 81 is an example of the "second engaging part" recited in claims.

Further, the second detachable unit 1b is provided with two positioning holes 81. On the other hand, the first detachable unit 1a is provided with no positioning hole 81. The detachable unit mounting portion 2a of the stationary unit 2 is provided with two positioning pins 82 so as to correspond to the two positioning holes 81. In this embodiment, the positioning mechanism 80 positions the detachable unit 1 with respect to the stationary unit 2 such that the detection unit 20 is arranged at a predetermined position with reference to the wire rope W in a state in which the first detachable unit 1a and the second detachable unit 1b, which are configured to be dividable, are combined.

(Setting of Arrangement of Positioning Mechanism)

Figure 11:
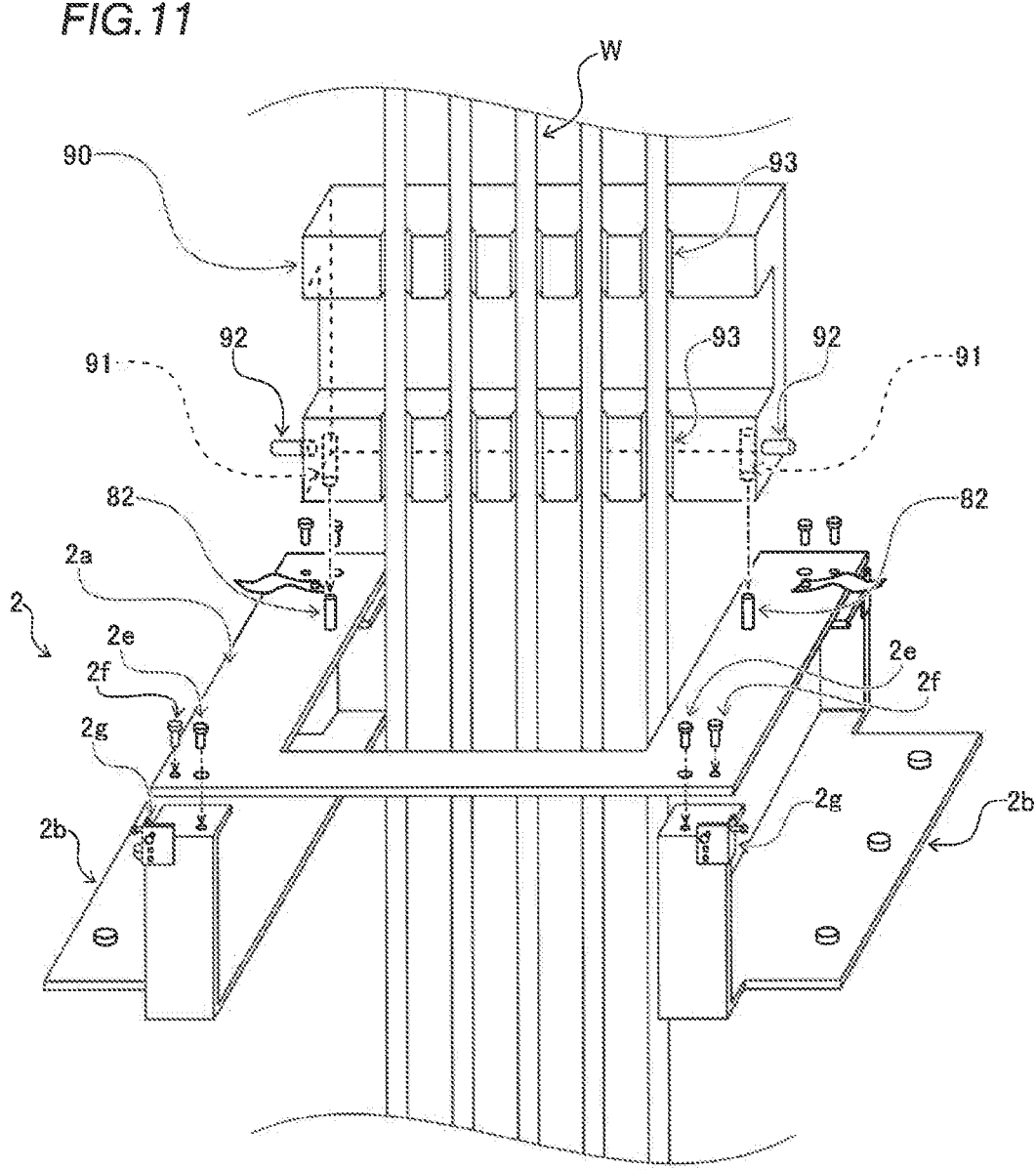
FIG. 11 is a diagram for explaining a configuration of a positioning jig.

As shown in FIG. 11, in the wire rope inspection device 101 of this embodiment, when fixing the stationary unit 2 with respect to the elevator 103, the relative arrangement of the positioning mechanism 80 (positioning pin 82) with respect to the wire rope W is set. Specifically, the relative position of the detachable unit mounting portion 2a in which the positioning pin 82 of the positioning mechanism 80 is arranged is adjusted. With this, the position of the positioning pin 82 of the positioning mechanism 80 is adjusted such that the excitation unit 10 and the detection unit 20 are arranged at a predetermined position with respect to the wire rope W.

Specifically, the stationary unit 2 includes pulling screws 2e and pushing screws 2f for adjusting the position of the detachable unit mounting portion 2a. In this embodiment, the pulling screws 2e and the pushing screws 2f adjust the position of the detachable unit mounting portion 2a in a plane (the XY-plane) perpendicular to the extending direction of the wire rope W and the inclination of the detachable unit mounting portion 2a with respect to the extending direction (Z-direction) of the wire rope W. Note that the pulling screw 2e and the pushing screw 2f are one example of the "position adjuster" recited in claims.

The pulling screw 2e passes through a hole formed in the detachable unit mounting portion 2a and is screwed into a hole formed in the base portion 2b. The hole of the detachable unit mounting portion 2a formed for the pulling screw 2e is larger in width than the threaded portion of the pulling screw 2e. Therefore, in a state in which the pulling screw 2e is screwed to the base portion 2b, the detachable unit mounting portion 2a can be finely adjusted in the XY-plane. On the other hand, the pushing screw 2f is screwed into the hole formed in the detachable unit mounting portion 2a and comes into contact with the outer surface of the base portion 2b. That is, no hole for the pushing screw 2f is formed in the base portion 2b. Therefore, by screwing the pushing screw 2f into the hole of the detachable unit mounting portion 2a, the position of the detachable unit mounting portion 2a with respect to the base portion 2b in the Z-direction can be finely adjusted.

Further, one piece of the pulling screw 2e and one piece of the pushing screw 2f are provided at each of the four corners of the detachable unit mounting portion 2a (a total of four pieces of pulling screws 2e and a total of four pieces of the pushing screws 2f are provided). By using the pulling screws 2e and the pushing screws 2f, the detachable unit mounting portion 2a is attached to the base portion 2b while being finely adjusted in the position. At this time, four pieces of position adjustment brackets 2g fixed to the base portion 2b are used. The side surfaces of the detachable unit mounting portion 2a at each of the four corners thereof are pressurized by the screws provided to the position adjustment bracket 2g. With this, the position of the detachable unit mounting portion 2a in the XY-plane is finely adjusted. Note that the position adjustment brackets 2g are removed after completion of the position adjustment by the pulling screws 2e and the pushing screws 2f.

In this embodiment, by adjusting the position of the detachable unit mounting portion 2a as described above, the arrangement of the positioning pin 82 of the positioning mechanism 80 is set. Here, in this embodiment, the position of the detachable unit mounting portion 2a is adjusted by using a positioning jig 90 such that the detachable unit mounting portion 2a is arranged at a predetermined position with reference to the wire rope W. In this embodiment, the positioning jig 90 is used to adjust the relative position of the stationary unit 2 (the detachable unit mounting portion 2a) with respect to the wire rope W.

The positioning jig 90 has a hole 91 and an engaging part 92. The hole 91 and the engaging part 92 correspond to the positioning hole 81 of the detachable unit 1 and the engaging part 1d of the detachable unit 1, respectively. That is, the positioning jig 90 is attached to the detachable unit mounting portion 2a in the same manner as in the detachable unit 1. The positioning jig 90 has grooves 93 each provided along the wire rope W, and the extending direction of the groove 93 and the surface of the positioning jig 90 that comes into contact with the detachable unit mounting portion 2a are configured to be perpendicular. The arrangement of the detachable unit mounting portion 2a is adjusted such that the groove 93 of the positioning jig 90 in a state of being attached to the detachable unit mounting portion 2a extends along the extending direction of the wire rope W.

That is, the inclination of the detachable unit mounting portion 2a is adjusted such that the surface of the detachable unit mounting portion 2a to which the detachable unit 1 is attached becomes perpendicular to the extending direction of the wire rope W. The position of the groove 93 of the positioning jig 90 is provided so as to correspond to the position of the detection unit 20 included in the detachable unit 1. For this reason, by adjusting the position of the detachable unit mounting portion 2a in the XY-plane such that the wire rope W comes into contact with the groove 93 of the positioning jig 90, the position of the positioning pin 82 is set such that the detection unit 20 is arranged at a predetermined position with reference to the wire rope W. Note that the positioning jig 90 is removed after completion of the positioning adjustment in the same manner as the position adjustment brackets 2g.

(A Plurality of Elevators)

Figure 12:
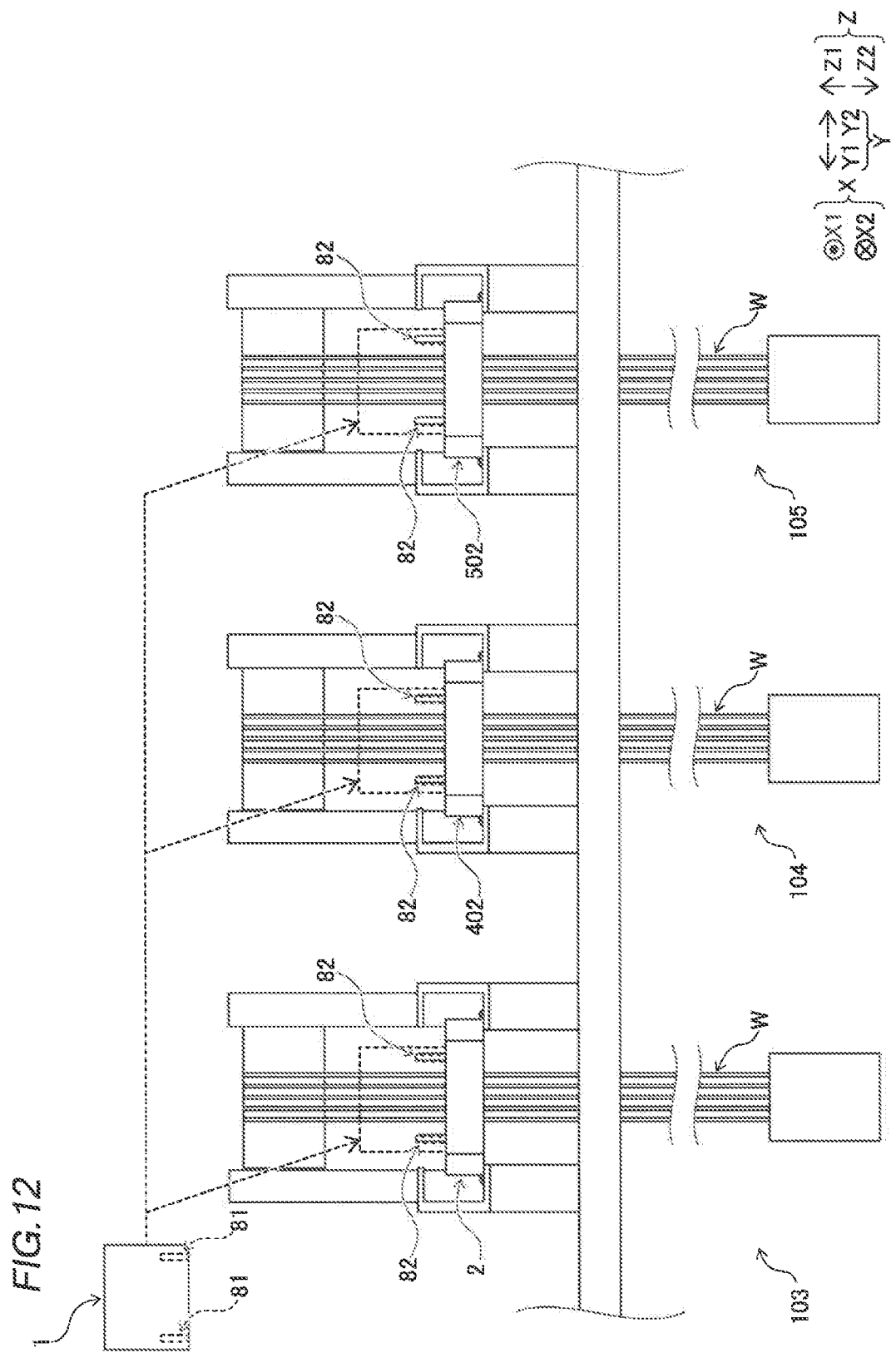
FIG. 12 is a diagram showing a plurality of stationary units in a plurality of elevators and a single detachable unit.

Further, as shown in FIG. 12, in this embodiment, the wire rope inspection system 100 is configured to be able to inspect the wire ropes W of a plurality of elevators 104 and 105 in addition to the elevator 103. The configuration of the elevator 104 and that of the elevator 105 are the same as that of the elevator 103.

In this embodiment, the wire rope inspection system 100 is provided with a plurality of stationary units, i.e., the stationary unit 2, the stationary unit 402, and the stationary unit 502, arranged for the plurality of elevators, i.e., the elevator 103, the elevator 104, and the elevator 105, respectively. The stationary unit 402 is arranged at the elevator 104, and the stationary unit 502 is arranged at the elevator 105. The configuration of the stationary unit 402 and that of the stationary unit 502 are the same as that of the stationary unit 2. In this embodiment, the wire rope inspection system 100 is provided with a single detachable unit 1 commonly used for the plurality of stationary units, i.e., the stationary unit 2, the stationary unit 402, and the stationary unit 502.

That is, the detachable unit 1 to be attached to the stationary unit 2 described above is configured to be mountable in common with respect to the stationary unit 402 and the stationary unit 502. In this embodiment, the positioning mechanism 80 is configured to position the common single detachable unit 1 with respect to each of the plurality of stationary units, i.e., the stationary unit 2, the stationary unit 402, and the stationary unit 502.

Specifically, the stationary units 402 and 502 are each provided with a positioning pin 82 in the same manner as the stationary unit 2. Then, in each of the stationary units 402 and 502, similarly to the stationary unit 2, the position and the angle of the positioning pin 82 with respect to the wire rope W are set (adjusted) in advance by using the common positioning jig 90. That is, in the wire rope inspection system 100, the plurality of stationary units 2, 402, and 502 is positioned such that the single detachable unit 1 is attached with respect to the wire rope W in the same positional relation.

That is, in the wire rope inspection system 100, in each of the plurality of elevators 103, 104, and 105, the detection unit 20 (the detection coil 21) of the detachable unit 1 is configured to be arranged at a predetermined position with reference to the wire rope W by the same condition (relative position).

(Positioning Method for Wire Rope Inspection System by this Embodiment)

Next, with reference to FIGS. 13 and 14, the positioning method for the wire rope inspection system 100 of this embodiment will be described. Note that, in the following description, an example will be described in which the detachable unit 1 is attached to the stationary unit 2, but the attaching method can be applied even in a case where the detachable unit 1 is attached to the stationary units 402 and 502.

Figure 13:
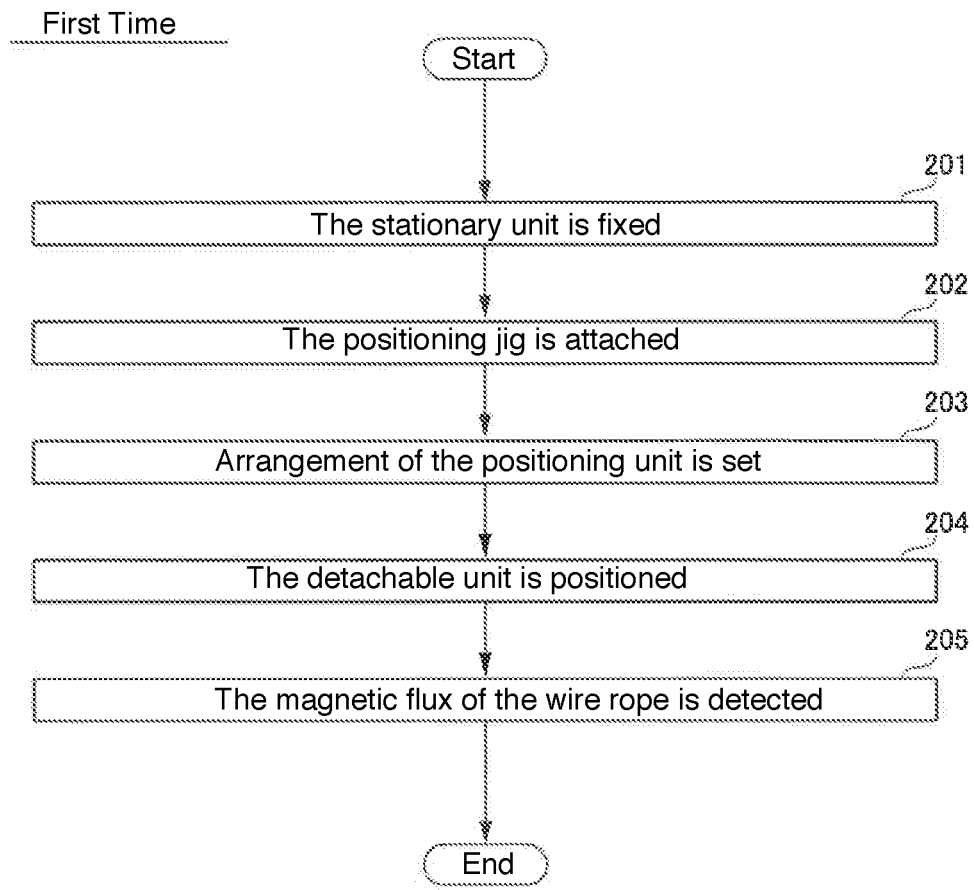
FIG. 13 is a flowchart for explaining a positioning method for a wire rope inspection system according to one embodiment.

As shown in FIG. 13, first, in Step 201, the stationary unit 2 is fixed to the frame 103f of the winding machine 103b of the elevator 103.

Next, in Step 202, the positioning jig 90 is attached to the detachable unit mounting portion 2a of the stationary unit 2 such that the detection unit 20 is arranged at a predetermined position with reference to the wire rope W.

Next, in Step 203, by adjusting the position of the stationary unit 2 (the detachable unit mounting portion 2a) such that the positioning jig 90 is arranged along the wire rope W, the position of the positioning mechanism 80 (the positioning pin 82) for positioning the detachable unit 1 with respect to the stationary unit 2 is set.

Next, in Step 204, by attaching the detachable unit 1 to the detachable unit mounting portion 2a of the stationary unit 2, the detachable unit 1 with respect to the stationary unit 2 is positioned by the positioning mechanism 80 (the positioning pin 82) in which the arrangement with respect to the wire rope W has been set.

Next, in Step 205, the magnetic flux of the wire rope W is detected by the detection unit 20 included in the detachable unit 1.

Figure 14:
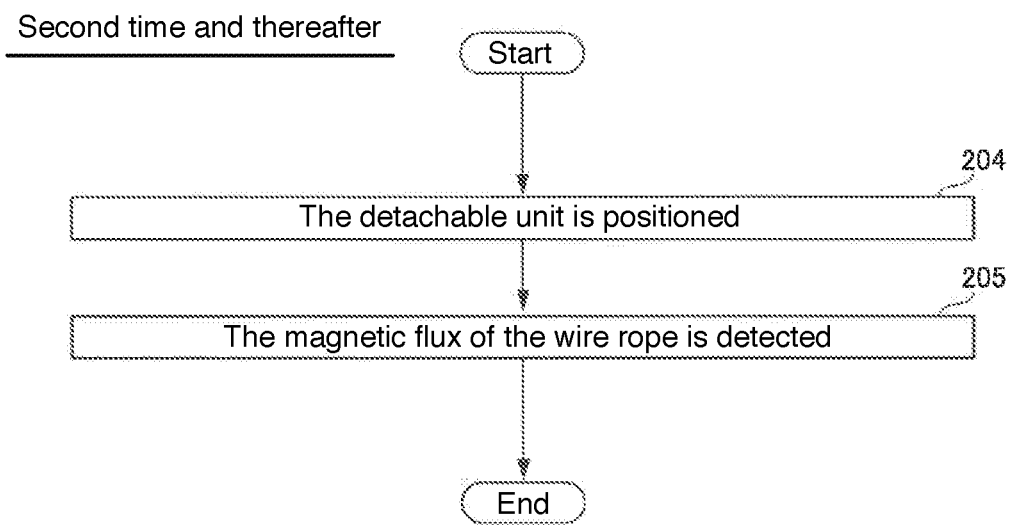
FIG. 14 is a flowchart for explaining a method of positioning a detachable unit with respect to a stationary unit in a state in which the arrangement of a positioning mechanism is set, in a wire rope inspection system according to one embodiment.

In addition, as shown in FIG. 14, in the positioning method according to the wire rope inspection system 100 of this embodiment, only Step 204 and Step 205 are executed in a case of attaching the detachable unit 1 to the stationary unit 2 for the second and subsequent times after Step 201 to Step 205 in FIG. 13 are executed for the first time (first). With this, in a state in which the detachable unit 1 is positioned with respect to the stationary unit 2, the detachable unit 1 is attached to the stationary unit 2, and the magnetic flux of the wire rope W is detected. With this, by adjusting the position of the stationary unit 2 (the detachable unit mounting portion 2a) using the positioning jig 90 when initially fixing the stationary unit 2 in proximity to the wire rope W, the arrangement of the positioning mechanism 80 is set. Therefore, it is possible to attach the detachable unit 1 to the stationary unit 2 in a state in which the detachable unit 1 is positioned by the positioning mechanism 80 in a state in which the arrangement has been already set, without setting the arrangement of the positioning mechanism 80 each time the detachable unit 1 is attached to the stationary unit 2. Therefore, in the case of attaching and detaching the detachable unit 1 with respect to the stationary unit 2 over a plurality of times, it is possible to easily arrange the detachable unit 1 at a predetermined position (inspection position) around the wire rope W.

Note that, also in the stationary unit 402 and the stationary unit 502, by setting the arrangement of the positioning mechanism 80 once, after the second time and thereafter, it is possible to easily attach the detachable unit 1 in a state in which the arrangement of the positioning mechanism 80 has been already set. Therefore, in the case of using the common detachable unit 1 for the plurality of elevators 103 to 105, it is possible to easily attach (replace) the detachable unit 1 for each of the stationary unit 2, the stationary unit 402, and the stationary unit 502.

(Effects of this Embodiment)

In the wire rope inspection system 100 of this embodiment, the following effects can be obtained.

In the wire rope inspection system 100 of this embodiment, as described above, it is provided with the positioning mechanism 80 for positioning the detachable unit 1 with respect to the stationary unit 2 such that the detection unit 20 is arranged at a predetermined position with reference to the wire rope W. With this, the removable portable detachable unit 1 is positioned with respect to the stationary unit 2 by the positioning mechanism 80. Therefore, it is possible to easily arrange the portable detection unit 20 arranged in the detachable unit 1 at a predetermined position with reference to the wire rope W. For this reason, it is possible to easily arrange the portable detection unit 20 at an accurate position for inspecting the wire rope W. Consequently, it is possible to reduce the workload for accurately arranging the portable detection unit 20 for inspecting the wire rope W with respect to the wire rope W.

Further, in this embodiment, other effects can be obtained by the following configuration.

That is, in this embodiment, the excitation unit 10 is arranged at the detachable unit 1 together with the detection unit 20. The positioning mechanism 80 positions the detachable unit 1 with respect to the stationary unit 2 such that the detection unit 20 and the excitation unit 10 are arranged at a predetermined position with reference to the wire rope W.

By configuring as described above, the detachable unit 1 is positioned by the positioning mechanism 80, which makes it possible to easily arrange the excitation unit 10 for applying a magnetic flux to the wire rope W, which is an inspection target, at the accurate position together with the detection unit 20. Therefore, even in a case where the excitation unit 10 is configured to be portable in addition to the detection unit 20, it is possible to reduce the workload for accurately arranging the excitation unit 10 and the detection unit 20 with respect to the wire rope W. Therefore, it is possible to further reduce the workload of the inspection operator for inspecting the wire rope W.

Further, in this embodiment, the positioning mechanism 80 includes the positioning pin 82 (first engaging part) provided on the stationary unit 2 and the positioning hole 81 (second engaging part) provided in the detachable unit 1 to be engaged with the positioning pin 82. The positioning pin 82 provided on the stationary unit 2 is engaged with the positioning hole 81 provided in the detachable unit 1, which positions the detachable unit 1 with respect to the stationary unit 2.

By configuring as described above, by inserting (engaging) the positioning pin 82 provided on the stationary unit 2 into (with) the positioning hole 81 provided in the detachable unit 1, the detachable unit 1 is positioned with respect to the stationary unit 2. Therefore, it is possible to more easily position the detachable unit 1 and also possible to easily remove the detachable unit 1 from the stationary unit 2 after completion of the inspection. For this reason, by providing the positioning pin 82 and the positioning hole 81, it is possible to easily attach and detach the detachable unit 1 with respect to the stationary unit 2 and also possible to easily position the detachable unit 1 with respect to the stationary unit 2.

Further, in this embodiment, the stationary unit 2 includes the detachable unit mounting portion 2a and pulling screws 2e and pushing screws 2f (position adjusters). The detachable unit mounting portion 2a is configured to mount the detachable unit 1 in such a manner as to be able to adjust the relative position with respect to the wire rope W. The pulling screws 2e and the pushing screws 2f (position adjusters) adjust the position of the detachable unit mounting portion 2a in a plane perpendicular to the extending direction of the wire rope W and the inclination of the detachable unit mounting portion 2a with respect to the extending direction of the wire rope W. The positioning mechanism 80 positions the detachable unit 1 in a state of being attached to the detachable unit mounting portion 2a with respect to the stationary unit 2.

By configuring as described above, it is possible to adjust the relative position of the detachable unit mounting portion 2a to which the detachable unit 1 is mounted, with respect to the wire rope W, and therefore, the position of the detachable unit 1 with respect to the wire rope W can be more accurately adjusted. Therefore, by adjusting the position of the detachable unit mounting portion 2a, it is possible to more accurately arrange the detection unit 20 at a predetermined position.

Further, in this embodiment, the detachable unit 1 is configured to be divided into the first detachable unit 1a to be arranged on one side in a direction perpendicular to the extending direction of the wire rope W and the second detachable unit 1b to be arranged on the other side in a state of being combined with the first detachable unit 1a. The positioning mechanism 80 positions the detachable unit 1 with respect to the stationary unit 2 such that the detection unit 20 is arranged at a predetermined position with reference to the wire rope W in a state in which the first detachable unit 1a and the second detachable unit 1b are combined.

By configuring as described above, the detachable unit 1 is configured to be divided into the first detachable unit 1a and the second detachable unit 1b, and therefore, it is possible to easily arrange the detachable unit 1 so as to surround the wire rope W by dividing the detachable unit 1, without inserting the end of the wire rope W into the interior of the detachable unit 1. Therefore, it is possible to easily arrange the detection unit 20 provided in the detachable unit 1 around the wire rope W. Therefore, the workload of the inspection operator for arranging the detection unit 20 around the wire rope W can be reduced.

Further, in this embodiment, the detection unit 20 is configured to detect the magnetic flux of the wire rope W suspending the cage 103a of the elevator 103. The stationary unit 2 is fixed to the frame 103f (main body) of the winding machine 103b (drive unit) for moving the wire rope W to raise and lower the cage 103a of the elevator 103.

By configuring as described above, it is possible to attach the detachable unit 1 configured to be detachable to the stationary unit 2 fixed to the frame 103f of the winding machine 103b for winding up the wire rope W of the elevator 103 while being positioned by the positioning mechanism 80. Therefore, it is possible to easily arrange the detection unit 20 in the proximity of the wire rope W of the elevator 103, which makes it possible to easily arrange the detection unit 20 at a predetermined position where the inspection of the wire rope W is performed. As a result, in the case of inspecting the wire rope W for suspending the cage 103a of the elevator 103, the workload of the inspection operator for accurately positioning the detection unit 20 can be reduced.

Further, in this embodiment, the positioning mechanism 80 positions the detachable unit 1 with respect to the stationary unit 2 such that the detection unit 20 is arranged at the predetermined position surrounding the part of the wire rope W of the winding machine 103b (drive unit) extending from the sheave 103d to the cage 103a around which the wire rope W is wound. Here, for example, in a case where the detachable unit 1 is arranged between the two sheaves, i.e., the sheave 103d and the sheave 103e, of the winding machine 103b in order to arrange the detection unit 20 at a predetermined position with respect to the wire rope W, the detachable unit 1 is required to be attached so as to be arranged under the winding machine 103b. In this event, the workload for attaching the detachable unit 1 to the stationary unit 2 increases.

In this embodiment, on the other hand, the positioning mechanism 80 positions the detachable unit 1 with respect to the stationary unit 2 such that the detection unit 20 is arranged at the predetermined position surrounding the part of the wire rope W extending from the sheave 103d of the winding machine 103b around which the wire rope W is wound to the cage 103a. By configuring as described above, it is possible to easily arrange the detachable unit 1 from the outer side of the winding machine 103b while being positioned with respect to the stationary unit 2, without being arranged on the lower side of the winding machine 103b. Therefore, by configuring such that the detection unit 20 is arranged at a predetermined position surrounding the part of the wire rope W extending from the sheave 103d of the winding machine 103b to the cage 103a, the workload for attaching detachable unit 1 to the stationary unit 2 can be further reduced.

Further, in this embodiment, the stationary units 2, 402, and 502 are arranged for the elevators 103, 104, and 105, respectively. The detachable unit 1 is a single detachable unit 1 commonly used for the plurality of stationary units 2, 402, and 502. The positioning mechanism 80 positions the single common detachable unit 1 for each of the plurality of stationary units 2, 402, and 502.

By configuring as described above, the single common detachable unit 1 can be used for the plurality of stationary units 2, 402, and 502 for the plurality of elevators 103, 104, and 105. Therefore, as compared with the case of using a plurality of separate detachable units 1 for the plurality of stationary units 2, 402, and 502, it is possible to simplify the configuration of the system.

Further, the positioning mechanism 80 can position the common single detachable unit 1 with respect to each of the plurality of stationary units 2, 402, and 502. Therefore, in the case of inspecting the wire rope W of each of the plurality of elevators 103, 104, and 105, it is possible to easily position and arrange the common detachable unit 1. Therefore, even in the case of inspecting the wire rope W of each of the plurality of elevators 103, 104, and 105 by the detection unit 20 arranged in the common detachable unit 1, it is possible to reduce the workload of the inspection operator for arranging the detection unit 20 at a predetermined position.

Further, in this embodiment, the stationary unit 2 includes the magnetic field application unit 40 for aligning the magnetization direction of the wire rope W by applying a magnetic field in advance with respect to the wire rope W and the holding unit 60 for holding the magnetic field application unit 40.

By configuring as described above, the magnetic field application unit 40 for applying a magnetic field to the wire rope W in advance is arranged in a state of being held by the holding unit 60 of the stationary unit 2, and therefore, the inspection can be performed more accurately on the wire rope W in a state in which the magnetic field is aligned in advance by the magnetic field application unit 40 by the detection unit 20 arranged in the detachable unit 1.

Further, for example, in the same manner as in this embodiment, in the case of arranging two magnetic field application parts 40a and 40b such that the magnetic poles of the same pole face to each other with respect to the wire rope W, the two magnetic field application parts 40a and 40b repel each other. In this case, in the case of arranging the magnetic field application unit 40 (the magnetic field application parts 40a and 40b) at the detachable unit 1, it is required to arrange the detachable unit 1 around the wire rope W while resisting the magnitude of the repulsive force between the two magnetic field application parts 40a and 40b. Therefore, it is considered that the workload of the inspection operator for arranging the detachable unit 1 increases due to the repulsive force between the magnetic field application parts 40a and 40b.

In contrast, in this embodiment, the magnetic field application unit 40 (the magnetic field application parts 40a and 40b) is arranged at the stationary unit 2 rather than at the detachable unit 1. Therefore, even in the case of arranging two magnetic field application parts 40a and 40b such that the magnetic poles of the same pole face each other with respect to the wire rope W, there is no need to arrange the detachable unit 1 while resisting the repulsive force between the magnetic field application parts 40a and 40b. Therefore, it is possible to suppress the increase in the work burden of the inspection operator for arranging the detection unit 20 at a predetermined position with respect to the wire rope W.

Further, in this embodiment, the stationary unit 2 is provided with the roller unit 50 (movement suppressing unit) for suppressing the movements of the wire rope W in a direction perpendicular to the extending direction of the wire rope W by coming into contact with the wire rope W. The holding unit 60 holds the magnetic field application unit 40 and the roller unit 50. By configuring as described above, the roller unit 50 arranged at the stationary unit 2 can suppress the movements (vibrations) of the wire rope W in a direction perpendicular to the extending direction of the wire rope W. Therefore, it is possible to arrange the detection unit 20 in a state of being more closely approached the wire rope W. Consequently, it is possible to further improve the detection sensitivity (detection accuracy) by the detection unit 20.

Further, by providing the roller unit 50 on the side of the stationary unit 2, it is possible to suppress the complication of the configuration of the detachable unit 1 as compared with the case of providing the roller unit 50 on the side of the detachable unit 1, which in turn can relatively reduce the weight of the detachable unit 1. Therefore, even in the case of suppressing the vibrations of the wire rope W by the roller unit 50, it is possible to reduce the workload at the time of arranging the detachable unit 1 in the vicinity of the wire rope W.

In this embodiment, the holding unit 60 is configured to be able to change the separation distance from the wire rope W. The stationary unit 2 is provided with the distance adjustment mechanism 70 capable of relatively decreasing the separation distance at the time of the inspection operation and relatively increasing the separation distance at the time of the normal operation, by moving the holding unit 60.

By configuring as described above, by the distance adjustment mechanism 70 provided at the stationary unit 2, only at the time of the inspection operation, it is possible to bring the magnetic field application unit 40 and the roller unit 50 (movement suppressing unit), which are held by the holding unit 60, closer to the wire rope W. Therefore, at the time of the normal operation, it is possible to move the holding unit 60 (the magnetic field application unit 40 and the roller unit 50) away from the wire rope W. Therefore, it is possible to suppress the movements (operations) of the wire rope W from being hindered by bringing the holding unit 60 (the magnetic field application unit 40 and the roller unit 50) closer to the wire rope W.

Further, in this embodiment, the detection unit 20 is provided with the detection coil 21 to be arranged so as to surround the wire rope W along the extending direction of the wire rope W. The positioning mechanism 80 positions the detachable unit 1 with respect to the stationary unit 2 such that the detection coil 21 of the detection unit 20 is arranged so as to surround the wire rope W at a predetermined position surrounding the wire rope W.

By configuring as described above, even in the case of inspecting the wire rope W by a total magnetic flux method that performs the measurement of the entire magnetic flux inside the wire rope W by arranging the detection coil 21 so as to surround the wire rope W, it is possible to easily arrange the detection coil 21 provided in the detachable unit 1 at a predetermined position by positioning the detachable unit 1 by the positioning mechanism 80. Consequently, even in the case of inspecting the wire rope W by a total magnetic flux method, it is possible to reduce the workload of the inspection operator for accurately arranging the detection coils 21.

(Effects of Positioning Method for Wire Rope Inspection System by this Embodiment)

According to the positioning method for the wire rope inspection system of this embodiment, the following effects can be obtained.

In the positioning method of the wire rope inspection system according to this embodiment, as described above, the method uses the positioning mechanism 80 for positioning the detachable unit 1 with respect to the stationary unit 2 such that the detachable unit 1 is arranged at a predetermined position with reference to the wire rope W. With this, the detachable portable detachable unit 1 is positioned with respect to the stationary unit 2 by the positioning mechanism 80. Therefore, the portable detection unit 20 provided in the detachable unit 1 can be easily arranged at a predetermined position with reference to the wire rope W. Therefore, it is possible to easily arrange the portable detection unit 20 at an accurate position for inspecting the wire rope W. Consequently, it is possible to provide a positioning method for a wire rope inspection system capable of reducing the workload for accurately arranging the portable detection unit 20 for inspecting the wire rope W with respect to the wire rope W.

[Modifications]

It should be understood that the embodiments disclosed here are examples in all respects and are not restrictive. The scope of the present invention is shown by claims rather than the descriptions of the embodiments described above, and includes all changes (modifications) within the meaning equivalent to the claims.

For example, in the above-described embodiment, an example is shown in which the excitation unit 10 is arranged at the detachable unit 1 together with the detection unit 20, but the present invention is not limited thereto. In the present invention, the excitation unit 10 may be arranged at the stationary unit 2. Similarly, the control unit (control board 30) may be arranged at the stationary unit 2 instead of the detachable unit 1.

Further, in the above-described embodiment, an example is shown in which the detachable unit 1 is positioned with respect to the stationary unit 2 by inserting the positioning pin 82 provided on the side of the stationary unit 2 into the positioning hole 81 provided on the side of the detachable unit 1, but the present invention is not limited thereto. For example, it may be configured such that the detachable unit 1 is positioned by providing a positioning pin on the side of the detachable unit 1 and inserting the positioning pin on the side of the detachable unit 1 into a hole provided on the side of the stationary unit 2. It may also be configured such that the detachable unit 1 is positioned with respect to the stationary unit 2 by, for example, a guide rail or a claw-shaped engaging member, rather than a positioning pin.

Further, in the above-described embodiment, an example is shown in which the detachable unit mounting portion 2a for mounting the detachable unit 1 thereon is configured to be adjustable in the relative position with respect to the wire rope W, but the present invention is not limited thereto. For example, it may be configured such that the position and the angle of the positioning pin 82 itself of the stationary unit 2 is adjustable with respect to the wire rope W. Further, it may be configured such that the position of the positioning mechanism 80 can be set (adjusted) such that the detection unit 20 is arranged at a predetermined position with reference to the wire rope W by adjusting the position and the angle of the stationary unit 2 with respect to the winding machine 103b (drive unit).

In the above-described embodiment, an example in which the detachable unit 1 is configured to be divided into the first detachable unit 1a and the second detachable unit 1b, but the present invention is not limited thereto. For example, it may be configured such that the detachable unit 1 is not divided into two parts and that a movable portion, such as, e.g., a hinge, is provided to the detachable unit 1 without dividing the detachable unit 1 into two parts so that the detachable unit 1 can be detachably mounted on the stationary unit 1.

Further, in the above-described embodiment, an example is shown in which the detection unit 20 detects the magnetic flux of the wire rope W suspending the cage 103a of the elevator 103, but the present invention is not limited thereto. For example, it may be configured such that detection unit 20 detects a magnetic flux of a wire rope W provided to a device other than an elevator, such as, a crane device. Further, it may be configured to detect a magnetic flux with respect to a wire rope W alone.

In the above-described embodiment, an example is shown in which the detection unit 20 is arranged at a predetermined position surrounding the part of the wire rope W extending from the sheave 103d of the winding machine 103b (drive unit) to the cage 103a, but the present invention is not limited thereto. For example, it may be configured such that the detection unit 20 is arranged so as to surround the wire rope W at a portion between the sheave 103d and the sheave 103e provided to the winding machine 103b.

In the above-described embodiment, an example is shown in which a common single detachable unit 1 is used for the plurality of stationary units 2, 402, and 502 arranged for the plurality of elevators 103, 104, and 105, but the present invention is not limited thereto. For example, it may be configured such that a plurality of detachable units each may be provided so as to be used for each of the plurality of stationary units 2, 402, and 502.

Further, in the above-described embodiment, an example is shown in which the magnetic flux of the wire rope W in a state in which the magnetic field has been aligned in advance by the magnetic field application unit 40 arranged at the stationary unit 2 is detected, the present invention is not limited thereto. For example, it may be configured to detect the magnetic flux without aligning the magnetic field without providing the magnetic field application unit 40. Further, it may be configured such that the magnetic field application unit 40 is arranged at the detachable unit 1 rather than the stationary unit 2.

Further, in the above-described embodiment, an example is shown in which the stationary unit 2 is provided with the roller unit 50 to suppress the movements (vibrations) of the wire rope W in a direction perpendicular to the extending direction of the wire rope W by coming into contact with the wire rope W, but the present invention is not limited thereto. For example, it may be configured such that the roller unit 50 (movement suppressing unit) is arranged at the detachable unit 1 rather than at the stationary unit 2. Further, it may be configured to provide a sliding portion for suppressing the movements of the wire rope W by coming into contact with the wire rope W while sliding against the wire rope W, in place of the roller unit 50 that rotates while in contact with the wire rope W. Further, it may be configured to inspect the wire rope W without providing a movement suppressing unit, such as, e.g., the roller unit 50 and the sliding portion.

Further, in the above-described embodiment, an example is shown in which the stationary unit 2 is configured such that the separation distance between the wire rope W and the holding unit 60 is set to be relatively small at the time of the inspection operation and relatively large at the time of the normal operation, by moving the holding unit 60 with respect to the stationary unit 1, but the present invention is not limited thereto. For example, it may be configured so as not to change the separation distance between the holding unit 60 and the wire rope W between at the time of the inspection operation time and at the time of the normal operation time. Further, it may be configured to be able to change the separation distance of only one of the magnetic field application unit 40 and the movement suppressing unit (the roller unit 50) with respect to the wire rope W.

In the above-described embodiment, an example is shown in which the magnetic flux of the wire rope W is detected by a total magnetic flux method, but the present invention is not limited thereto. For example, it may be configured such that the detection unit 20 detects the magnetic leakage flux from the outer surface of the wire rope W.

In the above-described embodiment, an example is shown in which each of the two detection coils of the detection unit 20, i.e., the first detection coil 21*a* and the second detection coil 21*b*, is an independent straddle-type coil (saddle-type coil), but the present invention is not limited thereto. For example, it may be configured such that the detection unit 20 forms a single solenoidal coil so as to surround the wire rope W by combining the first detachable unit 1*a* and the second detachable unit 1*b*.

Further, in the above-described embodiment, an example is shown in which the excitation coil 11 is provided so as to surround the outside of the detection coil 21 with respect to the wire rope W, but the present invention is not limited thereto. For example, it may be configured to arrange the excitation unit 10 and the detection unit 20 side by side along the extending direction of the wire rope W.

Further, in the above-described embodiment, an example is shown in which the detection signal acquired by the detection unit 20 of the wire rope inspection device 101 is outputted to the outside device (the processing device 102) via the communication unit 33, but the present invention is not limited thereto. For example, it may be configured such that a notification unit or a display unit is provided to the wire rope inspection device 101 to notify the inspection operator of the detection result (inspection result) based on the signal from the detection unit 20 in the wire rope inspection device 101.

In the above-described embodiment, an example is shown in which the detection coil 21 is provided to each of the plurality (five) of wire ropes W, but the present invention is not limited thereto. For example, it may be configured such that the detection coil 21 detects the magnetic flux of one or more and four or less wire ropes W or detects the magnetic fluxes of six or more wire ropes. Further, it may be configured to detect the magnetic fluxes of the plurality of wire ropes W by a single detection coil 21.

Further, in the above-described embodiment, an example is shown in which the magnetic field application part 40*a* and the magnetic field application part 40*b* arranged so as to face each other across the wire rope W are arranged such that the respective N-poles face the wire rope W, but the present invention is not limited thereto. For example, it may be configured such that two magnetic field application parts are arranged such that the N-pole and the S-pole face the wire rope W. Further, it may be configured such that the two magnetic field application parts are arranged such that the N-pole and the S-pole are arranged along the extending direction of the wire rope W, rather than the direction facing each other. In this case, the two magnetic field application parts may be the same orientation or different orientations. Further, it may be configured such that the magnetic field application unit may be arranged to apply the magnetic field in a direction inclined obliquely from the direction parallel to the extending direction of the wire rope W. Further, a single magnetic field application unit may be arranged on one side in the direction intersecting the extending direction of the wire rope W.

Further, in the above-described embodiment, an example is shown in which the magnetic field application unit 40 is configured by permanent magnets, but the present invention is not limited thereto. For example, the magnetic field application unit may be configured by electromagnets.

[Aspects]

It will be understood by those skilled in the art that the above-described exemplary embodiments are concrete examples of the following aspects.

(Item 1)

A wire rope inspection system comprising:
an excitation unit configured to apply a magnetic flux to a wire rope that is an inspection target;
a detection unit configured to detect a magnetic flux of the wire rope to which the magnetic flux has been applied by the excitation unit;
a detachable unit configured to be detachably mounted on a stationary unit fixed in proximity to the wire rope, the detachable unit being provided with at least the detection unit; and
a positioning mechanism configured to position the detachable unit with respect to the stationary unit such that the detection unit is arranged at a predetermined position with reference to the wire rope.

(Item 2)

The wire rope inspection system as recited in the above-described Item 1,
wherein the excitation unit is arranged at the detachable unit together with the detection unit, and
wherein the positioning mechanism positions the detachable unit with respect to the stationary unit such that the detection unit and the excitation unit are arranged at the predetermined position with reference to the wire rope.

(Item 3)

The wire rope inspection system as recited in the above-described Item 1 or 2,
wherein the positioning mechanism includes a first engaging part provided at the stationary unit and a second engaging part provided at the detachable unit, the second engaging part being configured to be engaged with the first engaging part, and
wherein the detachable unit is positioned with respect to the stationary unit by engaging the first engaging part provided at the stationary unit with the second engaging part provided at the detachable unit.

(Item 4)

The wire rope inspection system as recited in any one of the above-described Items 1 to 3,
wherein the stationary unit includes a detachable unit mounting portion and a position adjuster, the detachable unit mounting portion being configured to mount the detachable unit in such a manner as to be capable of adjusting a relative position of the detachable unit with respect to the wire rope, the position adjuster being configured to adjust a position of the detachable unit mounting portion in a plane perpendicular to an extending direction of the wire rope and an inclination of the detachable unit mounting portion with respect to the extending direction of the wire rope, and
wherein the positioning mechanism positions the detachable unit with respect to the stationary unit in a state of being attached to the detachable unit mounting portion.

(Item 5)

The wire rope inspection system as recited in any one of the above-described Items 1 to 4,
wherein the stationary unit includes a detachable unit mounting portion and a position adjuster, the detachable unit mounting portion being configured to mount the detachable unit thereon, the detachable unit mounting portion being capable of adjusting a relative position thereof with respect to the wire rope, the position adjuster being configured to adjust a position of the detachable unit mounting portion in a plane perpendicular to an extending direction of the wire rope and an inclination of the detachable unit mounting portion with respect to the extending direction of the wire rope, and
wherein the positioning mechanism positions the detachable unit with respect to the stationary unit in a state in which the detachable unit is attached to the detachable unit mounting portion.

(Item 6)

The wire rope inspection system as recited in any one of the above-described Items 1 to 6,
wherein the detection unit is configured to detect a magnetic flux of the wire rope hanging a cage of an elevator, and
wherein the stationary unit is fixed to a main body of a drive unit for moving the wire rope to raise and lower the cage of the elevator.

(Item 7)

The wire rope inspection system as recited in the above-described Item 6,
wherein the positioning mechanism positions the detachable unit with respect to the stationary unit such that the detection unit is positioned at the predetermined position surrounding an extending portion of the wire rope extending from a sheave of the drive unit on which the wire rope is wound to the cage.

(Item 8)

The wire rope inspection system as recited in the above-described Item 6 or 7,
wherein the stationary unit includes a plurality of stationary units each arranged for each of a plurality of elevators,
wherein the detachable unit includes one detachable unit commonly used for the plurality of stationary units, and
wherein the positioning mechanism positions the one detachable unit common to each of the plurality of stationary units.

(Item 9)

The wire rope inspection system as recited in any one of the above-described Items 1 to 8,
wherein the stationary unit includes a magnetic field application unit for aligning a magnetization direction of the wire rope by applying a magnetic field in advance with respect to the wire rope and a holding unit for holding the magnetic field application unit.

(Item 10)

The wire rope inspection system as recited in the above-described Item 9,
herein the stationary unit further includes a movement suppressing unit for suppressing a movement of the wire rope in a direction perpendicular to an extending direction of the wire rope by coming into contact with the wire rope, and
wherein the holding unit holds the magnetic field application unit and the movement suppressing unit.

(Item 11)

The wire rope inspection system as recited in the above-described Item 9 or 10,
wherein the holding unit is configured to change a separation distance from the wire rope to the holding unit, and
wherein the stationary unit includes a distance adjustment mechanism configured to relatively decrease the separation distance at the time of an inspection operation and relatively increase the separation distance at the time of a normal operation, in accordance with a movement of the holding unit.

(Item 12)

The wire rope inspection system as recited in any one of claims 1 to 11,
wherein the detection unit includes a detection coil to be wound around the wire rope along an extending direction of the wire rope, and
wherein the positioning mechanism positions the detachable unit with respect to the stationary unit such that the detection coil of the detection unit is wound around the wire rope at the predetermined position surrounding the wire rope.

(Item 13)

A positioning method for a wire rope inspection system, comprising the steps of:
attaching a positioning jig configured to adjust a relative position of a stationary unit fixed in proximity to a wire rope that is an inspection target with respect to the wire rope such that a detection unit configured to detect a magnetic flux of the wire rope is arranged at a predetermined position with reference to the wire rope;

setting a positioning mechanism configured to position a detachable unit with respect to the stationary unit by adjusting a position of the stationary unit such that the positioning jig is arranged along the wire rope, the detachable unit being provided with at least a detection unit and being configured to be detachably attached to the stationary unit; and positioning the detachable unit with respect to the stationary unit by the positioning mechanism by which the detachable unit has been positioned by attaching the detachable unit to the stationary unit to detect the magnetic flux of the wire rope by the detection unit.

The invention claimed is:

1. A wire rope inspection system comprising:
an excitation unit configured to apply a magnetic flux to a wire rope that is an inspection target;
a detection unit configured to detect a magnetic flux of the wire rope to which the magnetic flux has been applied by the excitation unit;
a detachable unit configured to be detachably mounted on a stationary unit fixed in proximity to the wire rope, the detachable unit being provided with at least the detection unit; and
a positioning mechanism configured to position the detachable unit with respect to the stationary unit such that the detection unit is arranged at a predetermined position with reference to the wire rope,
wherein the excitation unit is arranged at the detachable unit together with the detection unit, and
wherein the stationary unit includes a magnetic field application unit for aligning a magnetization direction of the wire rope by applying a magnetic field in advance with respect to the wire rope.

2. The wire rope inspection system as recited in claim 1, wherein the positioning mechanism positions the detachable unit with respect to the stationary unit such that the detection unit and the excitation unit are arranged at the predetermined position with reference to the wire rope.

3. The wire rope inspection system as recited in claim 1, wherein the positioning mechanism includes a first engaging part provided at the stationary unit and a second engaging part provided at the detachable unit, the second engaging part being configured to be engaged with the first engaging part, and
wherein the detachable unit is positioned with respect to the stationary unit by engaging the first engaging part provided at the stationary unit with the second engaging part provided at the detachable unit.

4. The wire rope inspection system as recited in claim 1, wherein the stationary unit includes a detachable unit mounting portion and a position adjuster, the detachable unit mounting portion being configured to mount the detachable unit thereon, the detachable unit mounting portion being capable of adjusting a relative position thereof with respect to the wire rope, the position adjuster being configured to adjust a position of the detachable unit mounting portion in a plane perpendicular to an extending direction of the wire rope and an inclination of the detachable unit mounting portion with respect to the extending direction of the wire rope, and
wherein the positioning mechanism positions the detachable unit with respect to the stationary unit in a state in which the detachable unit is attached to the detachable unit mounting portion.

5. The wire rope inspection system as recited in claim 1, wherein the detachable unit is configured to be divided into a first detachable unit to be arranged on one side in a direction perpendicular to an extending direction of the wire rope and a second detachable unit to be arranged on the other side in a state of being combined with the first detachable unit, and
wherein the positioning mechanism positions the detachable unit with respect to the stationary unit such that the detection unit is arranged at the predetermined position with reference to the wire rope in a state in which the first detachable unit and the second detachable unit are combined.

6. The wire rope inspection system as recited in claim 1, wherein the detection unit is configured to detect a magnetic flux of the wire rope hanging a cage of an elevator, and
wherein the stationary unit is fixed to a main body of a drive unit for moving the wire rope to raise and lower the cage of the elevator.

7. The wire rope inspection system subordinate to claim 6,
wherein the positioning mechanism positions the detachable unit with respect to the stationary unit such that the detection unit is positioned at the predetermined position surrounding an extending portion of the wire rope extending from a sheave of the drive unit on which the wire rope is wound to the cage.

8. The wire rope inspection system as recited in claim 6, wherein the stationary unit includes a plurality of stationary units each arranged for each of a plurality of elevators,
wherein the detachable unit includes one detachable unit commonly used for the plurality of stationary units, and
wherein the positioning mechanism positions the one detachable unit common to each of the plurality of stationary units.

9. The wire rope inspection system as recited in claim 1, wherein the stationary unit includes a holding unit for holding the magnetic field application unit.

10. The wire rope inspection system as recited in claim 9, wherein the stationary unit further includes a movement suppressing unit for suppressing a movement of the wire rope in a direction perpendicular to an extending direction of the wire rope by coming into contact with the wire rope, and
wherein the holding unit holds the magnetic field application unit and the movement suppressing unit.

11. The wire rope inspection system as recited in claim 9, wherein the holding unit is configured to change a separation distance from the wire rope to the holding unit, and
wherein the stationary unit includes a distance adjustment mechanism configured to relatively decrease the separation distance at the time of an inspection operation and relatively increase the separation distance at the time of a normal operation, in accordance with a movement of the holding unit.

12. The wire rope inspection system as recited in claim 1, wherein the detection unit includes a detection coil to be wound around the wire rope along an extending direction of the wire rope, and
wherein the positioning mechanism positions the detachable unit with respect to the stationary unit such that the detection coil of the detection unit is wound around the wire rope at the predetermined position surrounding the wire rope.

13. A positioning method for a wire rope inspection system, comprising the steps of:
- attaching a positioning jig configured to adjust a relative position of a stationary unit fixed in proximity to a wire rope that is an inspection target with respect to the wire rope such that a detection unit configured to detect a magnetic flux of the wire rope is arranged at a predetermined position with reference to the wire rope;
- setting a positioning mechanism configured to position a detachable unit with respect to the stationary unit by adjusting a position of the stationary unit such that the positioning jig is arranged along the wire rope, the detachable unit being provided with at least a detection unit and being configured to be detachably attached to the stationary unit; and
- positioning the detachable unit with respect to the stationary unit by the positioning mechanism by which the detachable unit has been positioned by attaching the detachable unit to the stationary unit to detect the magnetic flux of the wire rope by the detection unit.

* * * * *